United States Patent
Olsson et al.

(10) Patent No.: US 8,437,743 B2
(45) Date of Patent: May 7, 2013

(54) ACCESS NETWORK DISCOVERY AND SELECTION FUNCTION, ANDSF, NODE DISTRIBUTING CLOSED SUBSCRIBER GROUP, CSG, INFORMATION

(75) Inventors: Magnus Olsson, Stockholm (SE); Peter Bleckert, Stockholm (SE); Mats Buchmayer, Stockholm (SE); Arne Norefors, Stockholm (SE); Jari Vikberg, Järna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 13/381,400

(22) PCT Filed: Jul. 3, 2009

(86) PCT No.: PCT/SE2009/050868
§ 371 (c)(1),
(2), (4) Date: Jan. 27, 2012

(87) PCT Pub. No.: WO2011/002370
PCT Pub. Date: Jan. 6, 2011

(65) Prior Publication Data
US 2012/0122422 A1  May 17, 2012

(51) Int. Cl.
*H04M 1/66* (2006.01)
(52) U.S. Cl.
USPC ...... 455/411; 455/550.1; 455/418; 455/435.1
(58) Field of Classification Search .................. 455/411, 455/418, 550.1, 435.1
See application file for complete search history.

(56) References Cited

U.S. PATENT DOCUMENTS

| | | | |
|---|---|---|---|
| 2010/0003965 A1* | 1/2010 | Kurz et al. ..................... 455/411 |
| 2010/0029274 A1* | 2/2010 | Deshpande et al. ........ 455/435.3 |
| 2010/0144317 A1* | 6/2010 | Jung et al. ..................... 455/411 |
| 2010/0304748 A1* | 12/2010 | Henttonen et al. ............ 455/436 |
| 2011/0105083 A1* | 5/2011 | Wu ................................ 455/411 |
| 2011/0105127 A1* | 5/2011 | Wu ................................ 455/438 |
| 2011/0300867 A1* | 12/2011 | Matsuo et al. ................ 455/436 |

FOREIGN PATENT DOCUMENTS
WO   2009058068 A1   5/2009

OTHER PUBLICATIONS

Taaghol, P et al. "Seamless Integration of Mobile WiMAX in 3GPP Networks." IEEE Communications Magazine, vol. 46, No. 10, Oct. 2008, pp. 74-85.
Song, W. et al. "Improvements to Seamless Vertical Handover Between Mobile WiMAX and 3GPP UTRAN Through the Evolved Packet Core." IEEE Communications Magazine, vol. 447, No. 4, Apr. 2009, pp. 66-73.

* cited by examiner

*Primary Examiner* — Danh Le
(74) *Attorney, Agent, or Firm* — Coats & Bennett, P.L.L.C.

(57) ABSTRACT

The invention relates to a method in an Access Network Discovery and Selection Function, ANDSF, node for distributing Closed Subscriber Group information. The CSG information comprises an Allowed CSG List of a first UE and cell information indicating position of a cell with controlled access associated to the Allowed CSG List. The method comprises retrieving an Allowed CSG List of the radio cell from a CSG Database over a first network 10 interface (CSGi) between the ANDSF node and the CSG Database. Furthermore, the ANDSF node triggers the first UE to establish a connection to the ANDSF node over a second network interface (ANDSFi) between the ANDSF node (90) and the first UE. In addition, the ANDSF node receives cell information indicating the position of the cell with controlled access and the Allowed CSG List is sent to the first UE.

15 Claims, 14 Drawing Sheets

ACCESS NETWORK DISCOVERY AND SELECTION FUNCTION, ANDSF, NODE DISTRIBUTING CLOSED SUBSCRIBER GROUP, CSG, INFORMATION

TECHNICAL FIELD

Embodiments herein relate to an arrangement and method in an Access Network Discovery and Selection Function node and an arrangement and method in a User Equipment. Also a system in a radio telelcommunication network is disclosed. In particular, for distributing Closed Subscriber Group information within the radio telecommunications network.

BACKGROUND

In radio telecommunications systems of today a number of different types of base stations are provided serving different sizes of coverage areas. Some base stations serve bigger coverage areas, called macro cells, and some serve smaller areas, called micro cells. Today solutions of small radio cells with access control, so called femto solutions or home base stations are provided to serve small cells, for example, home base stations are provided in Wideband Code Division Multiple Access/Universal Terrestrial Radio Access Network (WCDMA/UTRAN) and in Evolved Universal Terrestrial Radio Access Network (E-UTRAN) also called the Long Term Evolution (LTE) Radio Access Network (RAN). The core network, to which E-UTRAN is connected, is called Evolved Packet Core (EPC), a.k.a. System Architecture Evolution (SAE) network. Both the E-UTRAN and the EPC comprise together the Evolved Packet System (EPS) that is also known as the SAE/LTE network. A base station of EPS is called E-UTRAN NodeB (eNodeB or eNB). An E-UTRAN base station provided for a home or small area coverage for a limited number of users is herein called Home eNodeB (HeNB). For WCDMA/UTRAN, this type of a home access point is called Home NodeB (HNB).

The HeNB provides radio coverage for the end users and is connected to a mobile core network using some kind of Internet Protocol (IP) based transmission. The radio coverage provided by the HeNB is herein called femtocell.

This way of providing Local Access enables cheaper call or transaction rates/charges when connected via an HeNB compared to when connected via an eNB. It may also reduce the load on an operator's eNBs and backhaul connections and thereby reduce the operator's Capital Expenditures (CAPEX) and Operating Expenditures (OPEX).

An HeNB uses, in most cases, an already existing broadband connection, e.g. Digital Subscriber Line (xDSL), Cable or the like, of the end users to achieve connectivity to the operator's mobile core network and possibly to other eNB/HeNB. Over the broadband connection and via other possible intermediate IP networks, e.g. in the internet, an HeNB communicates with the core network nodes in the operator's network using an Internet Protocol Security (IPsec) tunnel, defined in Internet Protocol security architecture according to RFC 4301. The IPsec tunnel is established between the HeNB and a Security Gateway (SEGW), wherein the SEGW protects the border of the operator's network.

An exemplary LTE/SAE network comprises both femto and macrocells, wherein a user equipment (UE) is arranged to be connected to a core network (CN). A number of HeNBs is arranged in the network to serve a respective femtocell through which the UE may be connected to the CN. The exemplary LTE/SAE network may further comprise a HeNB Gateway (HeNB GW). The main reasons for having a HeNB GW between the HeNBs and the CN are the following:

the assumed number of HeNBs in a network is very high, for example, millions of HeNBs is one estimate. This will possibly create a scaling problem in the CN side as each HeNB will have its own S1 interface and it is assumed that Mobility Management Entities (MMEs) of the CN are not capable of handling millions of S1 interfaces;

end users may switch on and off the HeNBs frequently causing increased signaling load between the HeNB and MME over the S1 interface. This will possibly create a signaling load problem in the CN side and mostly in the MME due to HeNB S1 interfaces being frequently disconnected and reconnected; and HeNBs may be tampered with e.g. malicious/modified software. This will possibly create a security problem in both the MME and Serving Gateway (S-GW) as any HeNB that is able to establish an IPsec tunnel to a security gateway of the operator's network may attack these nodes.

The HeNB GW 30 solves these scaling, signaling load and security problems.

Furthermore, the radio telecommunications system further comprises a number of eNBs each serving a macro cell. The macro cells are overlaying the femto cells. The UE may also use the macro cells to connect to the CN over S1 interfaces.

In the SAE/LTE and WCDMA/UTRAN 3GPP standards a concept known as Closed Subscriber Group (CSG) has been introduced. With CSG, particular HeNBs, may be associated to certain UEs, meaning that only these associated UEs are allowed to access the HeNBs. The allowed CSG Identities (CSG-ID) for a particular UE are stored in the UE in a so called Allowed CSG List. Thus, the Allowed CSG List comprises the CSG-IDs of the CSGs of which the subscriber is a member and may also comprise any additional qualifying or quantifying data associated with each CSG membership. An example of additional data is the CSG Type, which is a piece of textual or graphical information that the operator specifies and may associate with a CSG-ID in an Allowed CSG List. The purpose of the CSG Type is to display useful information on the UE, e.g. to give the user a hint on the applicable charging rates, such as "home", "visited" or "campus". Different users may have different CSG Type data associated with the same CSG-ID.

Each HeNB broadcasts in System Information (SI) both a CSG Indicator, a Boolean type of indicator, and the CSG-ID allocated to it. This means that the UE may determine by reading the CSG-ID from the SI and comparing this to the contents of the Allowed CSG List whether it is allowed to access a particular HeNB or more correctly the femtocell i.e. a CSG cell, associated with the SI and served by the HeNB as a HeNB could theoretically serve multiple femtocells and each of these cells may, at least theoretically, belong to different CSGs.

The Allowed CSG List for the UE is also stored in the CN, so that the CN may perform an ultimate access control, e.g. in case a hacked UE is used that has an outdated Allowed CSG List or misbehaves. Then the CN will have the latest Allowed CSG List of the UE and will know which CSG the UE is allowed to access. The administration related to the handling of which UEs are allowed to access a specific HeNB, or which UEs that should be added to the CSG of a HeNB, is performed by a CSG Manager.

Another concept related to the Allowed CSG List and femtocells is called radio cell footprint, may also be called radio cell fingerprint. This information defines the location of a specific CSG femtocell in relation to, for example, the overlaying macrocells, microcells, picocells and other femtocells. Thereby, the occasions when the UE needs to unnecessarily search for the allowed CSG femtocells is minimized as the UE may only search for a specific CSG femtocell when there is a match with the radio cell footprint associated with the CSG femtocell. Consequently also the negative impact this unnecessary search would have on the UE battery lifetime is minimized.

One possible variant to distribute the CSG information to the UEs could be enhancement of Non Access Stratum (NAS) signaling between the CN, that is, the MME or MSC/SGSN, and the UE. Another possibility could be usage of Short Message Service Over-The-Air (SMS OTA) configuration of the UE. The enhancement of NAS signaling means that all the MMEs, MSCs and/or SGSN nodes would need to be updated to support a distribution functionality. SMS OTA is a proprietary solution.

The assumed HeNB Operation and Maintenance (O&M), that is, the automatic configuration of the HeNBs, based on an Automatic Configuration Server (ACS), described below, is not appropriate for O&M of the UEs, i.e. downloading of the CSG related information to the UEs. For example, it does not fit well for the downloading of the Allowed CSG List information to the UEs as there are no mechanisms for the UEs to communicate with the ACS. This creates the problem that it is not possible to combine the O&M of the HeNBs with the limited O&M of the UEs in the same logical entities and therefore not gain from the possibility to coordinate information between these different O&M variants. There is a desire to distribute CSG information and CSG related information of any types of radio cells where the CSG concept is applied to in an efficient manner.

SUMMARY

It is an object of the present solution to provide methods and arrangements to optimize the distribution of the CSG information to a UE in a radio telecommunications network with radio cells with controlled access, such as femtocells and/or the like.

In a first aspect the object is achieved by providing a method in an Access Network Discovery and Selection Function (ANDSF) node. The ANDSF node is being comprised within a radio telecommunications network. The method is for distributing CSG information in the radio telecommunications network, wherein the CSG information comprises an Allowed CSG List of a first UE and cell information indicating position of a radio cell with controlled access associated to the Allowed CSG List.

The ANDSF node retrieves the Allowed CSG List of the first UE from a CSG database over a first network interface between the ANDSF node and the CSG database. The Allowed CSG List indicates that the first UE is allowed to access the radio cell. The ANDSF node, additionally, triggers the first UE to establish a connection to the ANDSF node over a second network interface between the ANDSF node and the first UE and the connection is set up to the first UE.

The ANDSF node also receives cell information indicating the position of the radio cell. In addition, the ANDSF node sends, to the first UE over the set up connection, the Allowed CSG List and to the first UE and/or a second UE within the radio telecommunications network, the cell information.

In a second aspect the object is achieved by providing an arrangement in the ANDSF node to perform the steps above. The arrangement comprises a retrieving unit arranged to retrieve the Allowed CSG List of the UE from the CSG database over a first network interface unit between the ANDSF node and the CSG DB. The Allowed CSG List indicates the radio cell with controlled access that the first UE is allowed to access. The arrangement further comprises a processing unit arranged to trigger the first UE to establish the connection to the ANDSF node over a second network interface unit between the ANDSF node and the first UE. The processing unit is further arranged to set up the connection to the first UE.

The arrangement additionally comprises a receiving unit arranged to receive cell information indicating the position of the radio cell with controlled access. Furthermore, the arrangement comprises a sending unit arranged to send to the first UE over the set up connection the Allowed CSG List. The arrangement is also arranged to send the cell information to the first UE and/or the second UE within the radio telecommunications network.

In a third aspect the object of the present solution is achieved by providing a method in the UE, denoted above as the first UE. The UE receives the trigger from the ANDSF node to establish the connection to the ANDSF node over the network interface between the ANDSF node and the UE. The UE sets up the connection to the ANDSF node. The UE then receives the Allowed CSG List indicating the radio cell with controlled access that the UE is allowed to access. In addition, the UE receives cell information indicating position of the radio cell over the set up connection from the ANDSF node and the UE stores the Allowed CSG List and the cell information in the UE.

In a fourth aspect the object is achieved by providing an arrangement in the UE to perform the method. The arrangement comprises a receiving unit arranged to receive the trigger from the ANDSF node to establish the connection to the ANDSF node over the network interface between the ANDSF node and the UE. The arrangement further comprises a processing unit arranged to set up the connection to the ANDSF node over a transmitting unit. The receiving unit is further arranged to receive from the ANDSF node over the set up connection the Allowed CSG List indicating a radio cell with controlled access that the UE is allowed to access and also to receive cell information indicating position of the radio cell. In addition, the arrangement comprises a memory unit arranged to be used to store the Allowed CSG List and the cell information in the UE.

In a fifth aspect the object is achieved by providing a system in a radio telecommunications network. The system comprises the CSG database and the ANDSF node arranged to be connected to the CSG database. The system further comprises the first UE arranged to be connected to the ANDSF node.

The ANDSF node in the system is further arranged to retrieve the Allowed CSG List of the first UE from the CSG database over the first network interface between the ANDSF node and the CSG Database.

Additionally, the ANDSF node in the system is arranged to trigger the first UE to establish a connection to the ANDSF node over the second network interface between the ANDSF node and the first UE.

The ANDSF node is further arranged to set up the connection to the first UE, and to receive cell information indicating the position of the radio cell with controlled access associated to the Allowed CSG List.

Furthermore, the ANDSF is arranged to send to the first UE over the set up connection, the Allowed CSG List, and to the first UE and/or the second UE within the radio telecommunications network, the cell information.

A function is introduced in the ANDSF node enabling the Allowed CSG List distribution to UEs. This may also be extended with the UEs reporting a radio cell footprint to the ANDSF node and then the ANDSF node may coordinate that all the relevant UEs gain from the availability of this information.

In some embodiments, O&M of the HeNBs and the O&M of the UEs are combined in different ways to gain of having the possibility to coordinate between these two types of O&M. In the simplest form, the ANDSF node is used for both types of O&M, i.e. in this case the ACS is not used anymore for HeNB O&M. In other embodiments, the ACS is still used for the HeNB O&M and an interface is introduced between the ACS and the ANDSF node for example to have the possibility to push information from the ACS to the ANDSF node. In one variant the ACS node connects directly to the ANDSF node in a similar way as a UE does and the needed information can be stored in the ANDSF node. In still another variant the HeNB is first configured using ACS and then the HeNB connects to the ANDSF node and uploads the information to the ANDSF node. In all these cases, the ANDSF node may use the information to update all the relevant UEs.

BRIEF DESCRIPTION OF THE DRAWINGS

Embodiments will now be described in more detail in relation to the enclosed drawings, in which.

DETAILED DESCRIPTION

Figure 1:
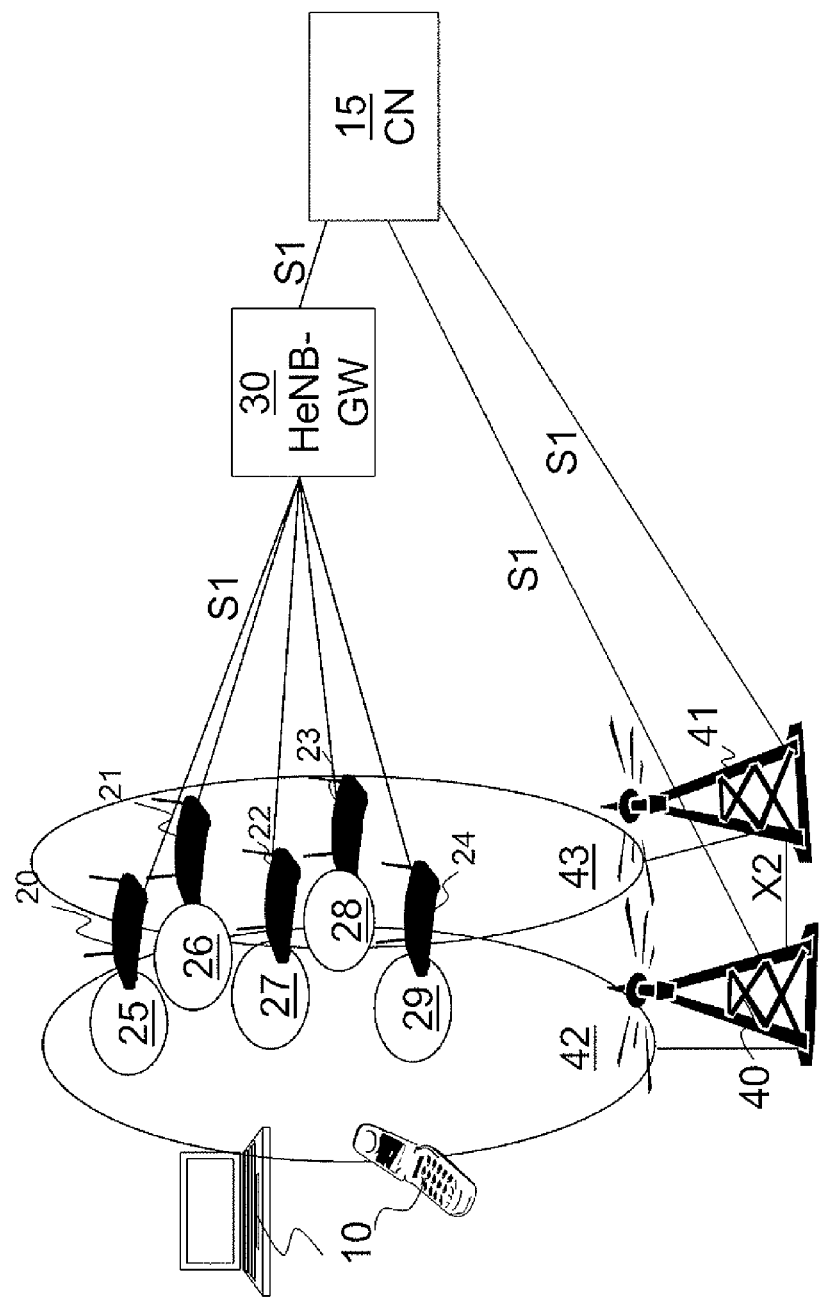
FIG. 1 shows a schematic overview of a radio telecommunications network.

FIG. 1 shows an example of an LTE/SAE network with both femto and macrocells as described above. The illustrated example discloses a user equipment (UE) 10 arranged to be connected to a core network (CN) 15. A number of HeNBs 20-24 are disclosed wherein each HeNB 20-24 serves a femtocell 25-29 through which UE 10 may be connected to the CN 15. FIG. 1 also shows a HeNB Gateway (HeNB GW) 30. The HeNB GW 30 solves the scaling, signaling load and security problems described above.

Furthermore, the radio telecommunications system further comprises a number of eNBs 40,41 each serving a macro cell 42, 43. The macro cells 42, 43 are overlaying the femto cells 25-29. The first UE 10 may also use the macro cells to connect to the CN 15 over S1 interfaces. The eNBs 40, 41 may communicate via an X2 interface arranged between the eNBs 40, 41.

The present solution relates to distribution of CSG information of, for example, the femtocells 25-29 to the first UE 10 and also to a second UE. The CSG information, in the form of Allowed CSG List and also cell information indicating position of the femtocell, such as a radio print of macro cells 42 and 43, is distributed to the first UE 10 and/or other UEs from an ANDSF node. The femto cell is associated to a base station indicated in the Allowed CSG List as a CSG. Thereby, an optimized distribution of the CSG information to the first UE 10 and/or a second UE is achieved. The present solution will be described in more detail below.

Figure 2:
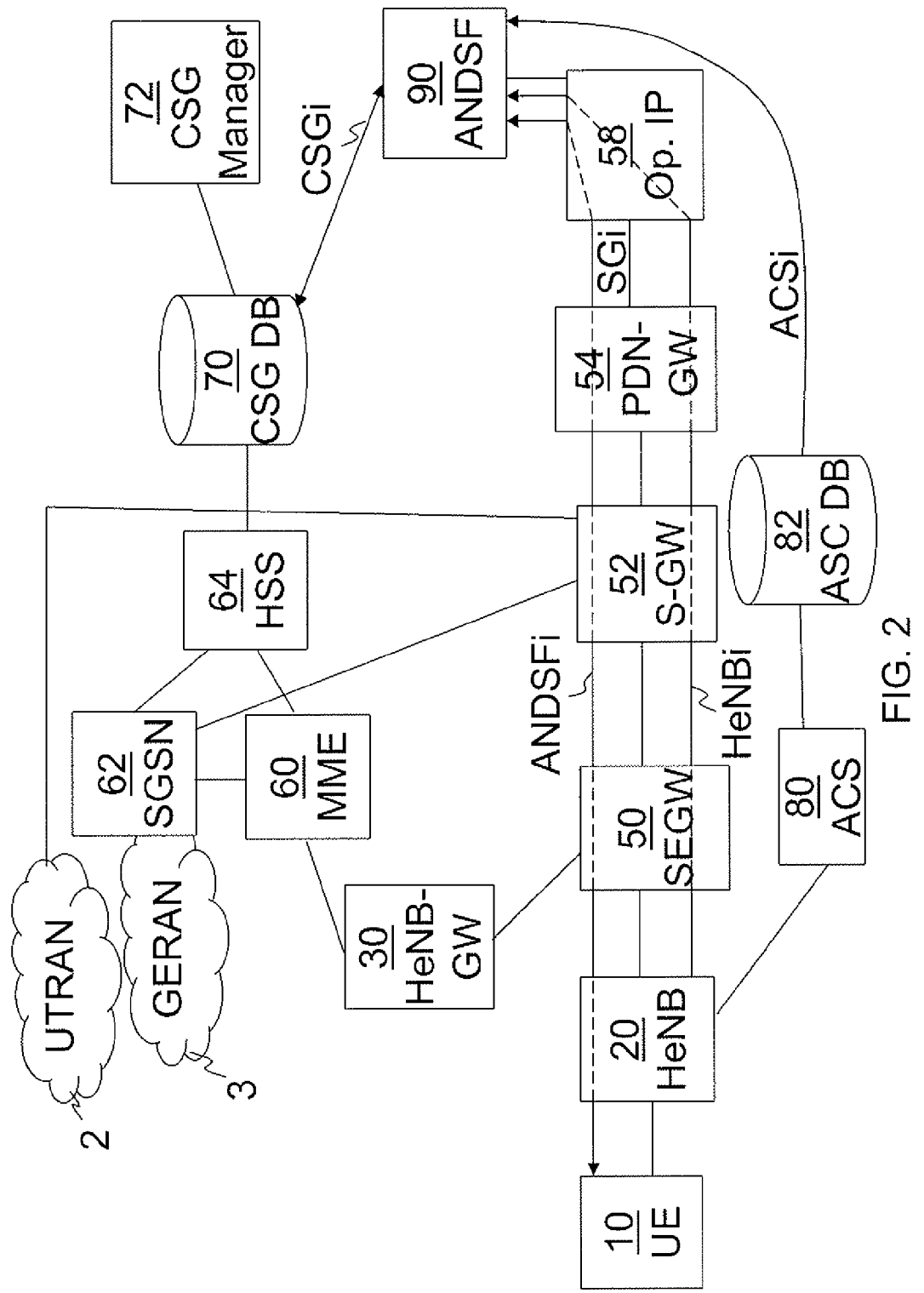
FIG. 2 shows a schematic overview of a radio telecommunications network.

In FIG. 2, a schematic overview of a radio telecommunications network is shown. E-UTRAN is using femto solution specific nodes and functions, i.e. HeNB, IP access network (not shown), SEGW, HeNB-GW and HeNB O&M based on ACS. FIG. 2 does not show a macro E-UTRAN network but it is obvious that the EPS supports both macro and femto radio access networks, as is also depicted in FIG. 1.

The radio telecommunications network comprises the first UE 10 connected over a HeNB 20 to the core network, the HeNB 20 serves a radio cell with controlled or restricted access, controlled access will be used below as a definition of the radio cell. A Security Gateway (SEGW) 50 may be logically placed between the HeNB 20 and an HeNB GW 30, and may serve for terminating IPsec tunnels from the HeNB 20. There exist different options in how the establishment of these IPsec tunnels is authenticated including, for example, certificate or Universal Subscriber Identity Module (USN) based authentication of the HeNB 20.

An Allowed CSG List for the first UE 10 is stored in the first UE 10 and also in the CN 15, so that the CN 15 may perform an ultimate access control, e.g. in case a hacked UE that has an outdated Allowed CSG List is trying to access a CSG or misbehaves, the CN 15 will compare with the Allowed CSG List stored in the CN 15. The Allowed CSG List for the first UE 10 is stored as part of the subscription information in a Home Location Register/Home Subscriber Server (HLR/HSS) 64. It is then downloaded to an MME 60, or to Mobile services Switching Centre (MSC) and/or Serving GPRS Support Node (SGSN) 62 when in WCDMA/UTRAN 2, as part of the subscriber profile information when the first UE 10 attaches to a specific MME or MSC or SGSN. The Radio Access Network (RAN) nodes, e.g. the HeNB 20 or the HeNB-GW 30 indicate the CSG-ID of the current femtocell to the MME 60. The MME 60 may perform the above mentioned ultimate access control.

The administration related to the handling of which UEs are allowed to access the HeNB 20, or which UEs that should be added to the CSG of the HeNB 20, is performed by a CSG Manager 72. In the simplest case, when the CSG relates to the single HeNB 20, the CSG Manager 72 is the end user, that is, the owner of the HeNB 20. One way to handle this is that the operator gives the end user some means to update the CSG information for the CSG of the single HeNB 20. This may be based on some web-based service, for example, the operator gives the end user some login credentials and home page address and then the end user, that is, the CSG Manager 72, may maintain the lists of users, i.e. CSG member groups of UEs, that are allowed to access that particular HeNB 20.

Radio cell footprint information defines the location of a specific CSG femtocell in relation to, for example, the overlaying macrocells, microcells, picocells and other femtocells. Thereby, the occasions when the UE needs to unnecessarily search for the allowed CSG femtocells is minimized and consequently also the negative impact this unnecessary search would have on the UE battery lifetime.

In the simplest form, the radio cell footprint comprises of a unique identifier of a single macro cell, e.g. the Enhanced-Cell Global Identity (E-CGI) of an E-UTRAN cell or the Cell Global Identity (CGI) of a GSM EDGE Radio Access Network (GERAN) cell 3. In this case, the first UE 10 would activate the search for the allowed CSG femtocell while it is camped on or active in that single macro cell. Other examples of radio cell footprint may be multiple cells detected simultaneously or some geographical location of the HeNB, e.g. longitude, latitude and also optionally altitude coordinates, if the first UE 10 is also equipped with a Global Positioning System (GPS) device.

One way to store the radio cell footprint is to have it included as part of the Allowed CSG List. For example, the first UE 10 stores the macro cell ID and CSG ID of a femtocell in the Allowed CSG List once it has successfully accessed the femtocell and the first UE 10 may use the stored information in consecutive access attempts.

The O&M of the HeNB 20 and femtocells may be automatically configured as these devices are installed by the end users themselves without any intervention from the operator's personnel, a.k.a. plug-and-play. The HeNB 20 may be managed by an Automatic Configuration Server (ACS) 80 via the extended protocol Customer-Premises Equipment Wide Area Network Management Protocol (CWMP), TR-069. The main principle is that the HeNB 20 may contact the ACS 80 during initial start-up process and download the needed configuration parameters, for example the CSG-ID and other radio related parameters allocated to the HeNB 20. It should be noted that the connection between the ACS 80 and the HeNB 20 may also be via the SEGW 50. The HeNB 20 may also include a so called UE Listener, that is, a UE module that scans the surrounding macro network and the HeNB 20 provides information of detected radio cells from the scan to the ACS 80 to assist in selecting the correct configuration parameters.

The SAE/LTE standardization has also defined how so called non-3GPP accesses, e.g. WiFi, WiMAX, may be connected to the EPC. This means that the first UE 10 may roam between 3GPP accesses e.g. GSM, WCDMA, LTE and non-3GPP accesses. This work has also introduced the need to give the mobile network the possibility to provide the first UE 10 with information, e.g. assistance data/policies, about which access types are available for the first UE 10 and how/when the first UE 10 should search for the different types of accesses. The network function that provides this information to the first UE 10 is called Access Network Discovery and Selection Function (ANDSF) node 90 and the first UE 10 accesses the ANDSF node 90 using IP-based protocols that are defined based on Open Mobile Alliance (OMA) Device Management (DM).

The information related to all different CSGs is shown as a CSG Database (DB) 70. The CSG Manager 72 is able to maintain the CSG for a particular CSG/femtocell in the CSG database 70 and the HSS 64 is also connected to the CSG database 70.

The CSG database 70 can be used to retrieve the CSG Member Group (MG) for one CSG/femtocell, i.e. the allowed UEs for a particular CSG. The CSG database 70 may also be used to retrieve the Allowed CSG List for the particular UE 10, i.e. the CSG or CSGs that the first UE 10 is allowed to access. This means that once the first UE 10 attaches to a public land mobile network (PLMN), the subscriber profile, including the Allowed CSG List, is loaded to the MME 60. The MME 60 is then able to perform the above described ultimate access control. The Allowed CSG List needs to be pushed also to the first UE 10.

The HeNB O&M node, also called ACS 80, is also shown together with a separate ACS database 82. This ACS database 82 comprises the needed information to be able to configure the HeNB 20 initially. For example, the CSG-ID for each HeNB 20 is configured in the ACS database 82, based on e.g. HeNB 20 serial number or other permanent identity, during sales time. At the same time, the CSG Manager 72 is given the needed information to configure UEs including UE 10 for that CSG ID so some coordination between the CSG database 70 and the ACS database 82 is performed as described below.

The ANDSF node 90 is also shown as being connected to an Operators IP network (Op. IP) 58 that the first UE 10 is able to access via an SGi interface over a Serving Gateway (S-GW) 52, and a Packet Data Network Gateway (PDN-GW) 54. The S-GW 52 routes and forwards user data packets, while also acting as the mobility anchor for the user plane during inter-eNB handovers and as the anchor for mobility between LTE and other 3GPP technologies. The PDN-GW 54 provides connectivity to the first UE 10 to external packet data networks by being the point of exit and entry of traffic for the first UE 10.

According to the present solution a function is introduced in the ANDSF node 90 to handle the Allowed CSG List distribution to UEs. In addition, the ANDSF node 90 may coordinate that all the relevant UEs, that is, UEs being a member of a CSG, gain from the availability of cell information, such as radio cell footprint, reported to the ANDSF node 90.

A first interface Closed Subscriber Group interface (CSGi) is introduced between the ANDSF node 90 and the CSG database 70. Also a second interface Access Network Discovery and Selection Function interface (ANDSFi) is introduced between the first UE 10 and the ANDSF node 90. It should here be noted that FIG. 2 shows this interface via the femto solution but it is obvious that the first UE 10 is able to connect to the ANDSF node 90 also via the macro E-UTRAN network, that is, via an eNB of the macro network, or via for example GSM/GERAN 3 or WCDMA/UTRAN 2 networks.

By using the existent ANDSF node 90 to distribute CSG information and cell information, no additional servers have to be introduced to the radio telecommunications network. Instead, an efficient solution is obtained by introducing the distribution of the Allowed CSG List and cell information indicating the position of the radio cell into the ANDSF node 90. The cell information may comprise radio cell footprint, for example, received at the ANDSF node 90 from UE 10 over the ANDSFi, from the HeNB 20 over a third interface Home eNodeB interface (HeNBi), and/or from the ACS database 82 over a fourth interface Automatic Configuration Server interface (ACSi). This cell information may then be distributed to other UEs in the CSG member group.

Figure 3:
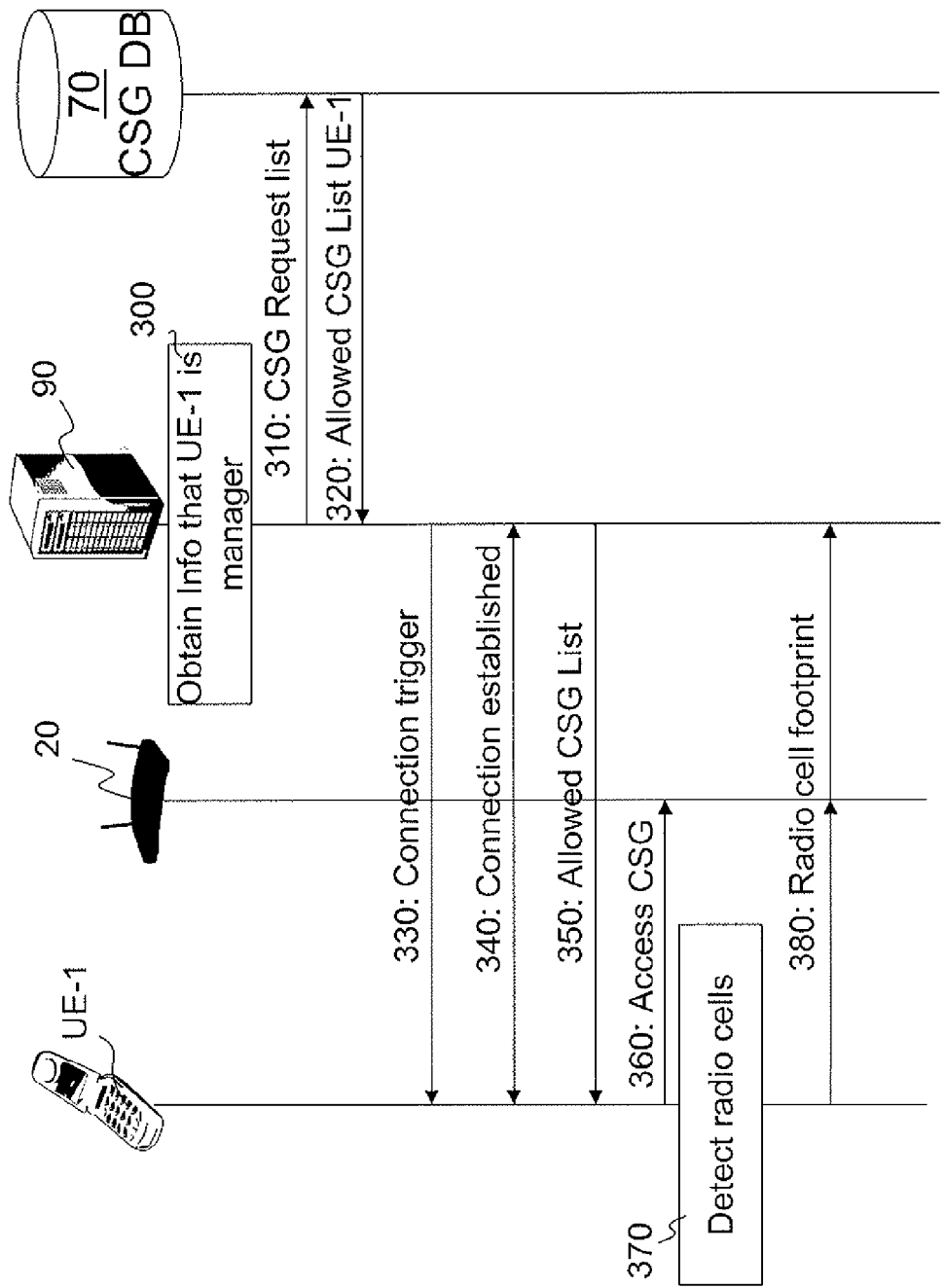
FIG. 3 shows a combined signalling and flowchart in a radio telecommunications network.

FIG. 3 shows an embodiment of the present solution illustrated in a combined method and signaling scheme.

The main principle of the present technique is that the ANDSF node 90 is used to handle the Allowed CSG List distribution to the first UE 10, denoted as UE-1 in FIGS. 3-7 for clarifying the illustrated examples. In the illustrated example, this is extended with the UE-1 reporting the radio cell footprint to the ANDSF node 90 and then the ANDSF node 90 coordinates that all the relevant UEs gain from the availability of this radio cell footprint information, as described below.

Initially, no UE is allowed access to a first CSG in the HeNB 20, but UE-1 will be added to the first CSG in the illustrated example.

First, a customer buys the new HeNB 20 and an operator of the radio telecommunications network associates a CSG, in the example called CSG-123, to the HeNB 20. The operator defines that UE-1 of the customer becomes the CSG Manager for CSG-123 and updates the CSG database 70.

In step 300, the ANDSF node 90 obtains information that the UE-1 is becoming the CSG manager for CSG-123. For example, an operator or re-seller updates the CSG database 70 and then this information may be pushed to the ANDSF node 90. This may trigger the ANDSF node 90 to retrieve the Allowed CSG List.

In step 310, the ANDSF node 90 sends a request to retrieve the Allowed CSG List for the UE-1 from the CSG database 70.

In step 320, the CSG database 70 sends the Allowed CSG List of the UE-1 to the ANDSF node 90. It should be understood that steps 310 and 320 are optional. It depends how the information is sent from the ANDSF node 90 to the first UE 10.

For example, it would be enough to just send the CSG-123 information to the UE-1 from the ANDSF node 90 and then no interaction with the CSG database 70 is needed. On the other hand, if the information sent to the UE-1 is always the whole Allowed CSG List then interaction with the CSG database 70 may be needed.

In step 330, the ANDSF node 90 triggers the UE-1 to establish a connection to the ANDSF node 90.

In step 340, a connection between the ANDSF node 90 and the UE-1 is established.

In step 350, the ANDSF node 90 updates the UE-1 with the new Allowed CSG List. At this stage, the radio cell footprint related to the CSG-123 may be empty.

In step 360, the UE-1 accesses the femtocell, that is, the CSG-123, served by the HeNB 20 and is also able to create a local radio cell footprint for the CSG-123.

In step 370, the UE-1 detects radio cells, such as macrocells, microcells, picocells and other femtocells forming a radio cell footprint when connected to the HeNB 20.

In step 380, the UE-1 contacts ANDSF node 90 again, via the HeNB 20, and informs the ANDSF node 90 about the new radio cell footprint.

Hence, an optimized, reliable and efficient distribution of the CSG information to the UE-1 in a telecommunications network with controlled/restricted access cells, such as femtocells, is obtained.

Figure 4:
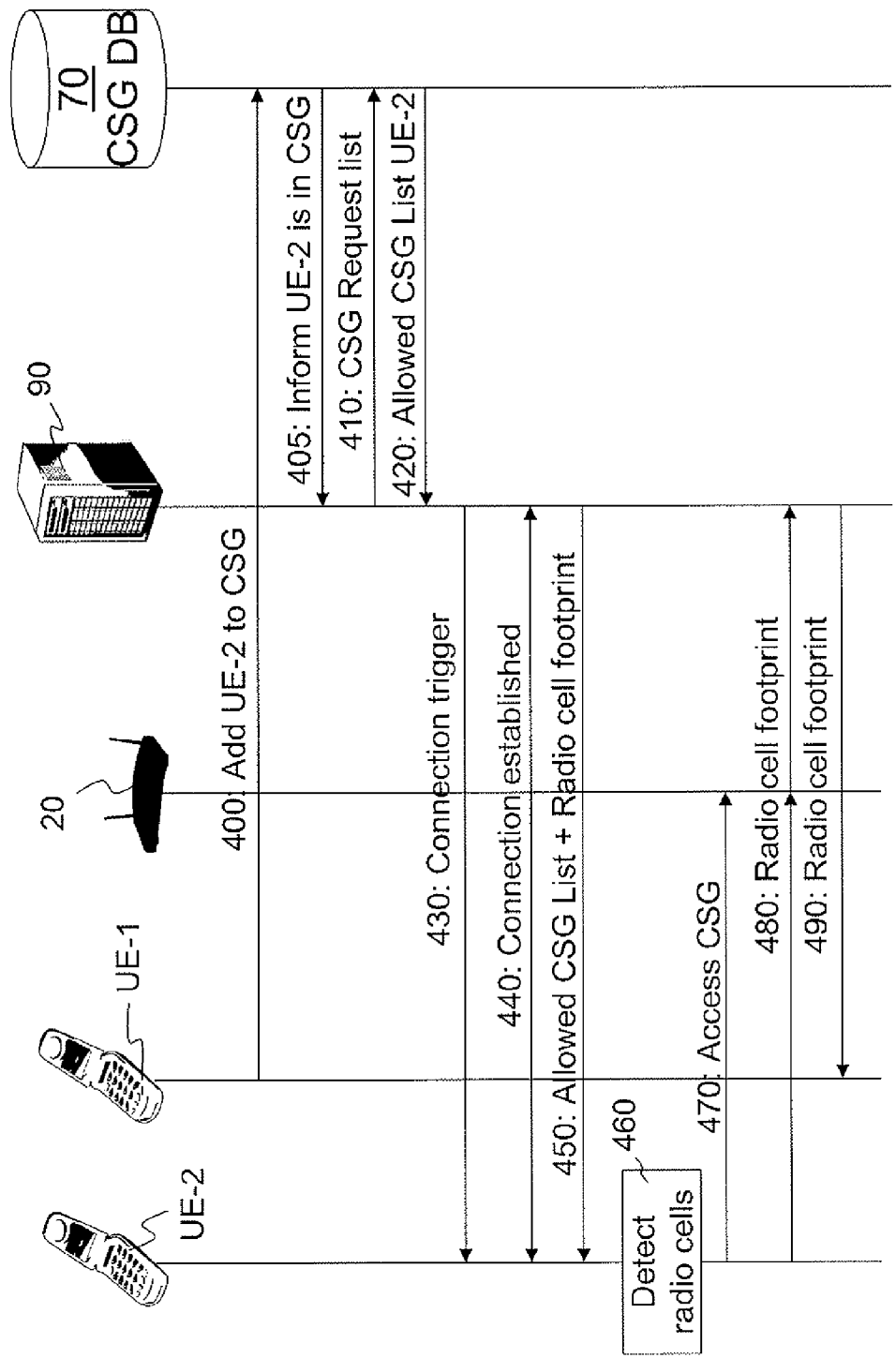
FIG. 4 shows a combined signalling and flowchart in a radio telecommunications network.

FIG. 4 is a combined signaling scheme and flowchart depicting further embodiments of the present solution. The illustrated example is to describe the adding of a second UE, UE-2, to the CSG-123 of FIG. 3.

In step 400, as the CSG Manager, the UE-1 updates and adds the other UE, i.e. UE-2, as an allowed UE to CSG-123 in the CSG database 70. Thus, the UE-2 is added to a Closed Subscriber Group Member Group (CSG member group) stored in the CSG database 70. The CSG member group pertains to a certain CSG, identified by its CSG-ID and comprises identities, such as International Mobile Subscriber Identity (IMSI) or Mobile Station International Subscriber Directory Number (MSISDN), of the members of the CSG and any qualifying or quantifying data associated with each membership. The CSG member group is defined and updated by the CSG Manager under the supervision of the operator. Since CSG member group data is related to subscriber data, a natural choice of storage is the operator's customer administration system (CAS).

In step 405, the ANDSF node 90 is informed about the UE-2 becoming a member of CSG-123 from the CSG database 70.

In step 410, the ANDSF node 90 sends a request to retrieve the Allowed CSG List for the UE-2 from the CSG database 70.

In step 420, the CSG database 70 sends the Allowed CSG List of the UE-2 to the ANDSF node 90. Similar to FIG. 3, the steps 410 and 420 are optional and depends how the information is sent from the ANDSF node 90 to the UE-2.

In step 430, the ANDSF node 90 triggers the UE-2 to establish a connection to the ANDSF node 90.

In step 440, the ANDSF node 90 establishes a connection between the ANDSF node 90 and the UE-2.

In step 450, the ANDSF node 90 updates the UE-2 with the new Allowed CSG List comprising CSG-123 and includes also the radio cell footprint related to the CSG-123 that UE-1 provided earlier in FIG. 3. In this way, the UE-2 may receive the radio cell footprint even before it has accessed CSG-123 the first time.

In step 460, the UE-2 detects radio cells, such as macrocells, microcells, picocells and other femtocells forming a radio cell footprint and compares the received radio cell footprint with detected radio cells. Once a match of detected radio cells and received radio cell footprint is found, the UE-2 starts to search for the CSG-123.

In step 470, when the UE-2 has found the CSG cell, the UE-2 accesses the CSG-123 served by the HeNB 20. The UE-2 is also able to create a second radio cell footprint about detected radio cells for the CSG-123 when connected to the HeNB 20.

In step 480, the UE-2 contacts ANDSF node 90 again, via the HeNB 20, and informs the ANDSF node 90 about the second radio cell footprint.

In step 490, the ANDSF node 90 is then able to update also UE-1 with the new radio cell footprint. ANDSF node 90 may also combine the different radio cell footprints reported from different UEs. In this case the ANDSF node 90 may also send the new combined radio cell footprint also to UE-2 (not shown).

The above example, illustrated in FIGS. 3-4, is described when there is a single HeNB 20 associated with a CSG, CSG-123. In this case, it is enough to identify the CSG in the communication between the first UE 10 and the ANDSF node 90. However, if there are multiple HeNBs serving one CSG, then the radio cell footprint needs to be made unique and this can be achieved for example by combining the CSG-ID with any unique base station or cell identifier, for example the E-CGI of the femtocell or the eNB-ID of the HeNB.

One main benefit with the shown example of optimized distribution of CSG related information is that the NAS signaling between UE and MME/SGSN/MSC does not need to be updated. Another benefit is that UE battery lifetime is increased as the UE-2 uses the received radio cell footprint to search and scan for the CSG-123. In the method described above, it is possible to coordinate between UE O&M information and combine the different information of different UEs. The shown methods may also be made generic for all different types of radio access network, even including Code Division Multiple Access (CDMA), as the main principle is to use IP-based communication towards the ANDSF node 90. It would also be possible to deploy e.g. LTE H(e)NB in a 2G/3G network without impact on the 2G/3G SGSN and MSC. The ANDSF node 90 is still used for access discovery and selection.

Embodiments herein use LTE Femto solution as an exemplary embodiment when describing the distribution of the CSG related information. However, the same or similar principle applies to other femto solutions, for example to the WCDMA/UTRAN femto solutions.

Also, the embodiments are described based on the ANDSF node 90 and the main principle is that almost any IP-based server may take the role of the ANDSF node 90 as long as a mechanism is introduced for the UEs, HeNBs and ACS to discover and resolve the address to such server.

In addition, it would be possible to let the UE-1 log mobility events, for example successful and unsuccessful Hand Over (HO) attempts, and upload the logged mobility events to the ANDSF node 90. This may further improve the radio cell footprint definition and network planning using the radio cell IDs of the HO processes as the radio cell footprint.

Figure 5:
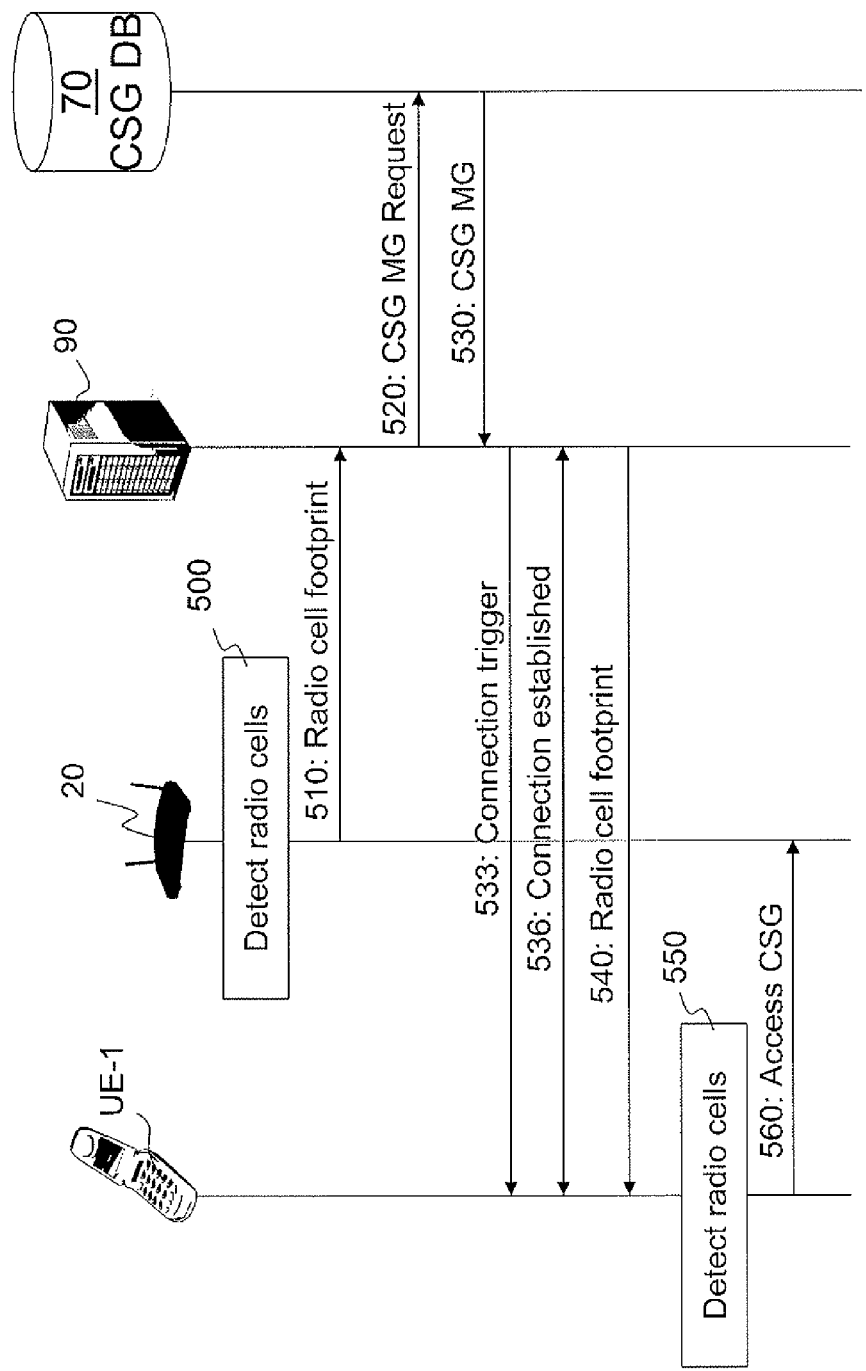
FIG. 5 shows a combined signalling and flowchart in a radio telecommunications network for distributing a radio cell footprint.

FIG. 5 is a combined signaling scheme and flowchart depicting further embodiments of the present solution. In the illustrated example, a way of distributing or coordinating HeNB O&M, that is, cell information to relevant UEs is described.

In step 500, the HeNB 20 detects the radio cell footprint of the femtocell of the HeNB 20. This may be detected by reports received from a UE, a GPS installed at the HeNB 20, a UE listener at the HeNB 20 and/or the like. This type of HeNB O&M information is to be exchanged between the HeNB 20 and the ANDSF 90.

In step 510, the HeNB 20 reports the detected radio cell footprint to the ANDSF 90 over the above mentioned interface HeNBi between HeNB 20 and ANDSF 90. Thus, the HeNB O&M is exchanged between the HeNB 20 and the ANDSF 90. The ANDSF node 90 is connected to the CSG database 70 over an interface, ANDSFi, between the ANDSF node 90 and the CSG database 70.

Figure 6:
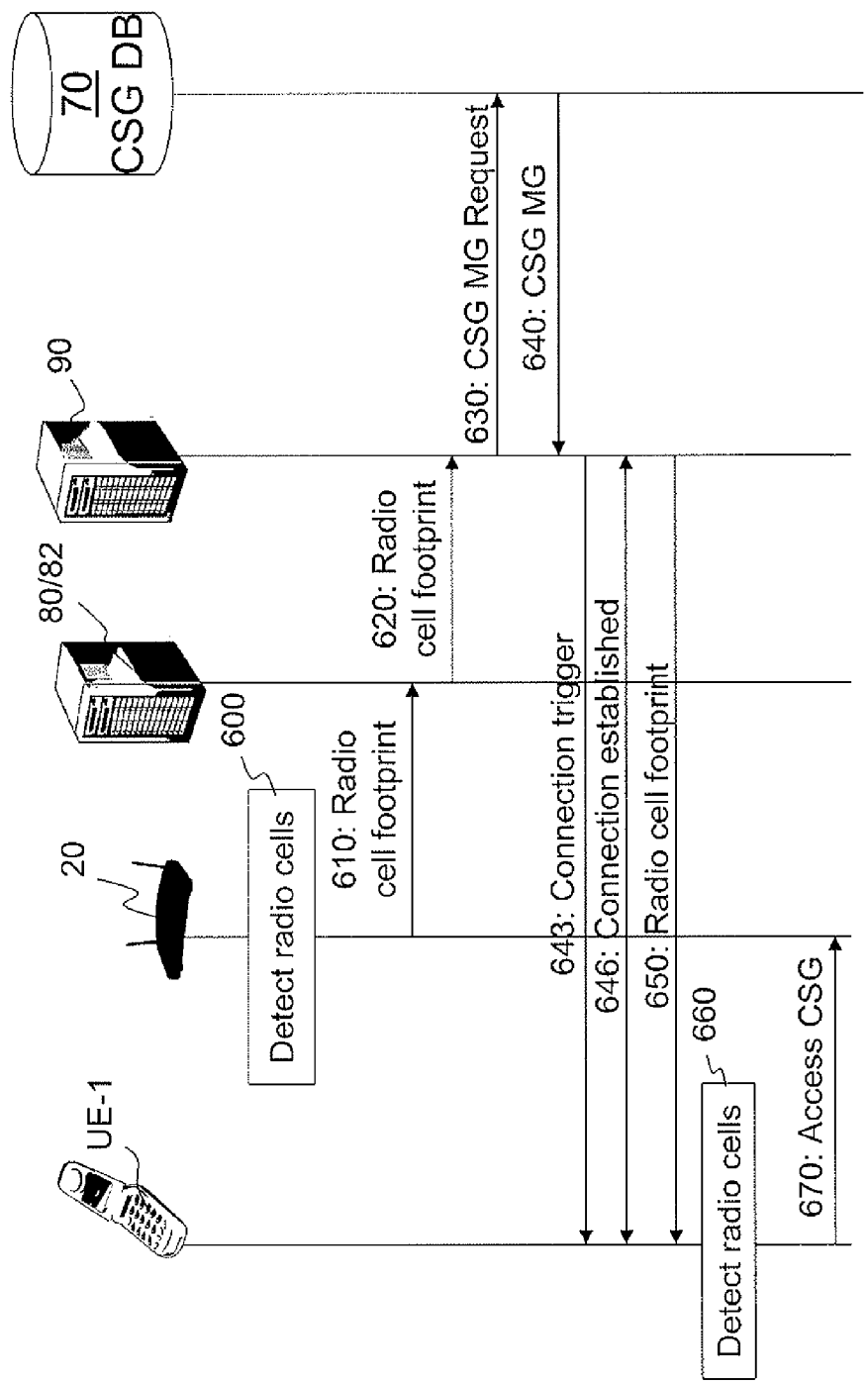
FIG. 6 shows a combined signalling and flowchart in a radio telecommunications network for distributing a radio cell footprint.
Figure 7:
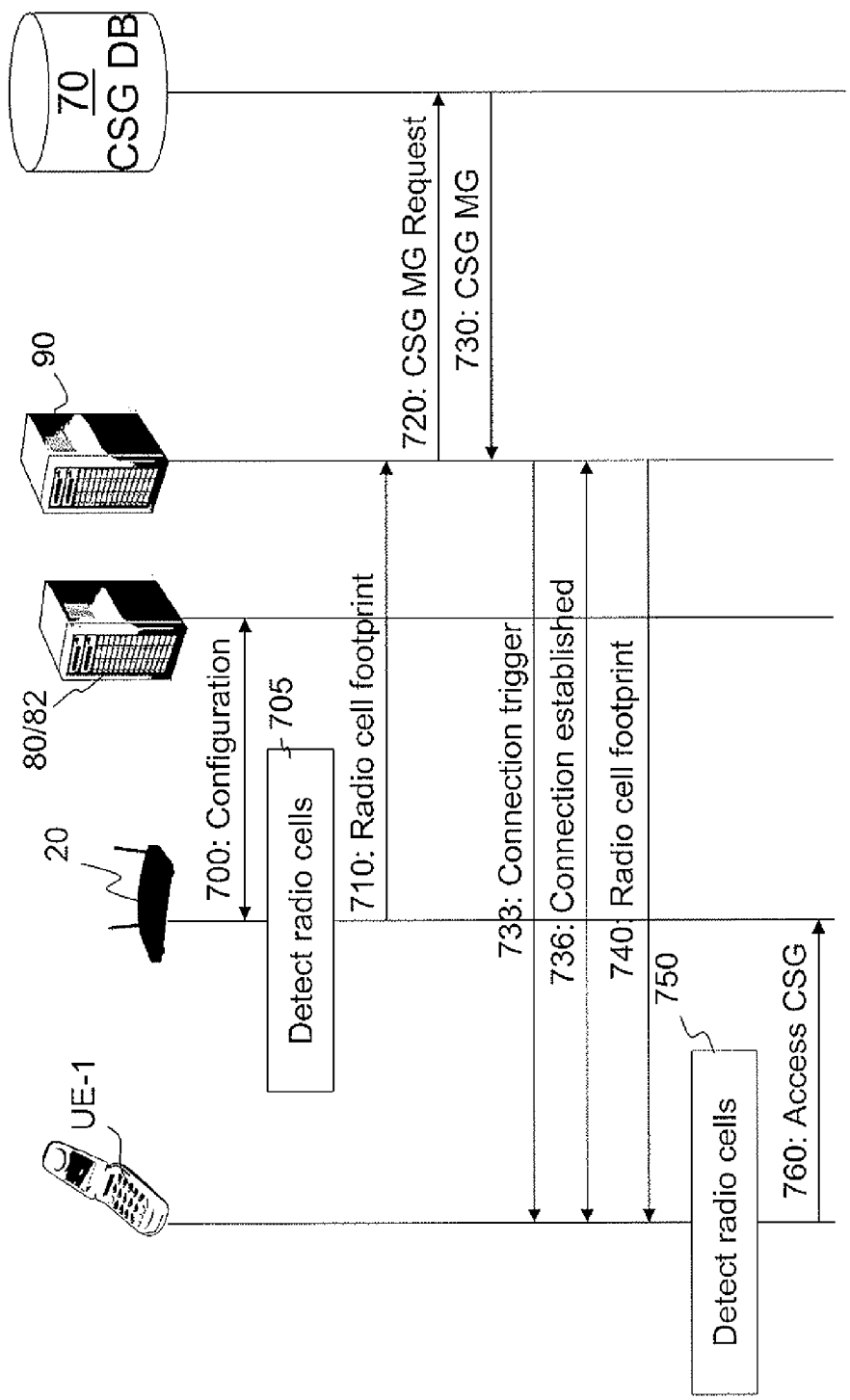
FIG. 7 shows a combined signalling and flowchart in a radio telecommunications network for distributing a radio cell footprint.

In step 520, the ANDSF node 90 uses the received information and requests the CSG database 70 for all UEs allowed accessing the HeNB 20. In the CSG database 70, CSG member groups, referred to as MG in the FIGS. 5-7, are stored indicating allowed UEs to access respective CSG.

In step 530, the CSG database 70 sends the CSG member group of CSG-123 to the ANDSF node 90. Then, the ANDSF node 90 determines, from the CSG member group, which UEs the radio cell footprint should be transmitted to, in the illustrated example UE-1.

In step 533, the ANDSF node 90 triggers the UE-1 of the CSG member group to establish a connection to the ANDSF node 90.

In step 536, the ANDSF node 90 establishes a connection between the ANDSF node 90 and the UE-1.

In step 540, the ANDSF node 90 transmits the received radio cell footprint to the UE-1 in the CSG member group. UE-1 is a member in the CSG member group and will receive the radio cell footprint from the ANDSF node 90 over the ANDSFi.

In step 550, the UE-1 receives the radio cell footprint and may start immediately or at a later time to scan for the radio cells in the radio cell footprint. The UE-1 then detects the femtocell using the radio cell footprint in an efficient manner. It should here be noted that the radio cell footprint may comprise merely location data of the femtocell comprising a geographical location of latitude, longitude, and/or altitude coordinates. Hence, the process of detecting the femtocell is speeded up and does not require such an amount of the energy and increases the lifetime of the batteries in the UE-1. The UE-1 could be located e.g. at work and the radio cell footprint information may be usable some time later, e.g. when UE-1 is moved where the HeNB 20 is located.

In step 560, the UE-1 then accesses the HeNB 20, right away or at a time later after UE-1 has found a match of the radio cell footprint, and connects to the radio telecommunications network.

The main principle of FIG. 5 is that the ANDSF node 90 could be used to handle both the HeNB O&M and the Allowed CSG List distribution to the UE-1 as described in FIGS. 3-4. Other possibilities would be that the HeNB O&M is still performed between the HeNB and the ACS and in addition to this the HeNB communicates with the ANDSF as described. This enables that the HeNB 20 may report a detected radio cell coverage to the ANDSF node 90 and the ANDSF node 90 may use this cell information as the radio cell footprint towards the relevant UEs. It should be noted that the UE-1, or any other UE part of the CSG member group for this CSG, may also report the radio cell footprint for a CSG cell to the ANDSF node 90 and the ANDSF node 90 may coordinate that all the relevant UEs gain from the availability of this cell information.

The detected radio cell coverage is not the only important cell information that the HeNB 20 may report to the ANDSF node 90. In addition, the HeNB 20 may contain, for example, a GPS device and may report the geographical location to the ANDSF node 90, for example, longitude, latitude, altitude. Still another possibility could be radio cells reported by the UE-1, or any other UE part of the CSG member group for this CSG, using an ANR (Automatic Neighbor Relation) function. This could be, for example, radio cells that the HeNB 20 is not able to detect, but that the UE-1, or any other UE part of the CSG member group for this CSG, may be able to detect.

The first UE 10 is connected to the ANDSF node 90 over the interface between the first UE 10 and the ANDSF node 90, ANDSFi. In the illustrated example, the HeNB O&M is not necessarily based on ACS anymore and instead, the ANDSF node 90 may also be used for HeNB O&M.

In some embodiments, the HeNB 20 connects directly to the ANDSF node 90 in a similar way as a UE 10 does, i.e. the HeNB 20 attaches to the EPC in the same way as a UE does, and the needed information can be stored in the ANDSF node 90. In another variant the HeNB contacts directly the ANDSF node 90 via the IP access network and not at all via the EPC.

FIG. 6 is a schematic combined method and signaling scheme depicting further embodiments of the present solution. In the illustrated example, a way of distributing or coordinating HeNB O&M, that is, cell information to relevant UEs is described.

In step 600, the HeNB 20 detects the radio cell footprint of the femtocell of the HeNB 20. This may be detected by reports received from a UE, a GPS installed at the HeNB 20, a UE listener at the HeNB 20. This type of HeNB O&M is to be exchanged between the HeNB 20 and a combined ACS 80 and ACS database 82.

In step 610, the HeNB 20 reports the radio cell footprint to the combined ACS 80 and ACS database 82.

In step 620, the combined ACS 80 and ACS database 82 forwards the radio cell footprint to the ANDSF node 90 over an interface, ACSi.

In step 630, the ANDSF node 90 uses the received information and requests the CSG database 70 for all UEs allowed to access the HeNB 20, that is, the CSG member group of the CSG. The step 630 of FIG. 6 corresponds to the step 520 of FIG. 5.

In step 640, the CSG database 70 sends the CSG member group to the ANDSF node 90. Then, the ANDSF node 90 determines, from the CSG member group, which UEs the radio cell footprint should be transmitted to, for example, UE-1. The step 640 of FIG. 6 corresponds to the step 530 of FIG. 5.

In step 643, the ANDSF node 90 triggers the UE-1 of the CSG member group to establish a connection to the ANDSF node 90. The step 643 of FIG. 6 corresponds to the step 533 of FIG. 5.

In step 646, the ANDSF node 90 establishes a connection between the ANDSF node 90 and the UE-1. The step 646 of FIG. 6 corresponds to the step 536 of FIG. 5.

In step 650, the ANDSF node 90 transmits the received radio cell footprint to the UEs in the CSG member group over the set up connection. The step 650 of FIG. 6 corresponds to the step 540 of FIG. 5.

In step 660, the UE-1 receives the radio cell footprint and starts, immediately or at a later time, to scan for the radio cells in the radio cell footprint to find the femtocell. The UE-1 may then find the CSG in an efficient manner. The step 660 of FIG. 6 corresponds to the step 550 of FIG. 5.

In step 670, the UE-1 may then access the HeNB 20, when the femtocell has been found, and connect to the radio telecommunications network. The step 670 of FIG. 6 corresponds to the step 560 of FIG. 5.

The main principle of the illustrated example in FIG. 6, is that the ACS database 82 is still used for HeNB O&M and ANDSF node 90 is used to handle both the radio cell footprint distribution and the Allowed CSG List distribution, as described in FIGS. 3-4, to the relevant UEs. An interface, ACSi, is introduced between the combined ACS 80 and ACS database 82 and ANDSF node 90 for example to have the possibility to push information from the ACS database 82 to the ANDSF node 90. In one variant the combined ACS 80 and ACS database 82 connects directly to the ANDSF node 90 in a similar way as a UE does and the needed information can be stored in the ANDSF node 90.

This enables that the HeNBs may report the detected radio cell coverage to the combined ACS 80 and ACS database 82. The ACS database 82 forwards the needed information directly to the ANDSF node 90 and the ANDSF node 90 may use this information as the radio cell footprint towards the relevant UEs. The UEs may also report the radio cell footprint for a CSG cell to the ANDSF node 90 and the ANDSF node 90 may coordinate that all the relevant UEs gain from the availability of this information.

Also in this case, the detected radio cell coverage is not the only important information that the HeNB 20 may report to the combined ACS 80 and ACS database 82. In addition, the HeNB 20 may contain for example a GPS device and may report the geographical location to the combined ACS 80 and ACS database 82 such as longitude, latitude and/or altitude. Still another possibility could be radio cells reported by the UEs using ANR (Automatic Neighbor Relation) function. This could be for example radio cells that the HeNB 20 is not able to detect, but that the first UE 10 may be able to detect.

The interfaces and other important aspects introduced in FIG. 6, is the interface, CSGi, between the ANDSF node 90 and the CSG DB, the interface, ANDSFi, between the UE and the ANDSF node 90, and the interface, ACSi, between the combined ACS 80 and ACS database 82 and the ANDSF node 90. Furthermore, the HeNB O&M is based on ACS 80, and the combined ACS 80 and ACS database 82 contacts directly the ANDSF node 90 and provides the needed information.

Hence, an efficient way of distributing the cell information to relevant UEs is provided.

FIG. 7 is a combined signaling scheme and flowchart depicting further embodiments of the present solution. In the illustrated example, a way of distributing or coordinating cell information to relevant UEs is described. ACS is used for HeNB O&M and the HeNB 20 updates the ANDSF node 90 with the cell information. The method steps do not have to be taken in the order stated below, but may be taken in any suitable order.

In step 700, the HeNB 20 is configured using the combined ACS 80/ACS database 82. Thus, HeNB 20 will contact the ACS 80/ACS database 82 during initial start-up process and download the needed configuration parameters, for example the CSG-ID and other radio related parameters allocated to the HeNB 20. The HeNB 20 may also include a so called UE Listener, and the HeNB 20 provides this information to the combined ACS 80/ACS 82 to assist in selecting the correct configuration parameters.

In step 705, the HeNB 20 detects a radio cell footprint of the femtocell of the HeNB 20. This may be detected by reports received from a UE, a GPS installed at the HeNB 20, a UE listener at the HeNB 20. This information is to be exchanged between the HeNB 20 and the ANDSF 90. The step 705 of FIG. 7 corresponds to the step 500 of FIG. 5.

In step 710, the HeNB 20 reports the detected radio cell footprint to the ANDSF 90. Thus, the radio cell footprint is exchanged between the HeNB 20 and the ANDSF 90. The ANDSF node 90 is connected to the CSG database 70 over the interface between the ANDSF node 90 and the CSG database 70. The step 710 of FIG. 7 corresponds to the step 510 of FIG. 5.

In step 720, the ANDSF node 90 uses the received information and requests the CSG database 70 for all UEs allowed to access the HeNB 20. The step 720 of FIG. 7 corresponds to the step 520 of FIG. 5.

In step 730, the CSG database 70 sends the CSG member group of allowed UEs to the ANDSF node 90. Then, the ANDSF node 90 determines, from the CSG member group, which UEs the radio cell footprint should be transmitted to. The step 730 of FIG. 7 corresponds to the step 530 of FIG. 5.

In step 733, the ANDSF node 90 triggers the UE-1 of the CSG member group to establish a connection to the ANDSF node 90. The step 733 of FIG. 7 corresponds to the step 533 of FIG. 5.

In step 736, the ANDSF node 90 establishes a connection between the ANDSF node 90 and the UE-1. The step 736 of FIG. 7 corresponds to the step 536 of FIG. 5.

In step 740, the ANDSF node 90 transmits the received radio cell footprint to the UEs in the CSG member group. The step 740 of FIG. 7 corresponds to the step 540 of FIG. 5.

In step 750, the UE-1 receives the radio cell footprint and starts to scan for the radio cells in the radio cell footprint. The UE-1 may then quickly detect the radio cells in the radio cell footprint. The step 750 of FIG. 7 corresponds to the step 550 of FIG. 5.

In step 760, the UE-1 then accesses the HeNB 20. The step 760 of FIG. 7 corresponds to the step 560 of FIG. 5.

The main principle in the illustrated embodiment of FIG. 7 is that the ACS is still used for HeNB O&M and ANDSF node 90 is used to handle the Allowed CSG List distribution, as described in FIGS. 3-4, as well as the radio cell footprint to the relevant UEs. An interface, HeNBi, is introduced between the HeNB 20 and the ANDSF node 90 to have the possibility to push information from the HeNB 20 to the ANDSF node 90. In one variant the HeNB 20 connects directly to the ANDSF node 90 in a similar way as a UE does. That is, the HeNB 20 attaches to the EPC in a same way as a UE does, and the needed information can be stored in the ANDSF node 90.

In another variant the HeNB contacts directly the ANDSF node 90, i.e. via the IP access network and not at all via the EPC.

This enables that the HeNB 20 may report the detected radio cell coverage to the ANDSF node 90 and the ANDSF node 90 may use this information as the radio cell footprint towards the relevant UEs. The UEs may also report the radio cell footprint for a CSG cell to the ANDSF node 90 and the ANDSF node 90 may coordinate that all the relevant UEs gain from the availability of this information.

Also in this case, the detected radio cell coverage is not the only important information that the HeNB 20 may report to the ANDSF node 90. In addition, the HeNB 20 may contain for example a GPS device and may report the geographical location to the ANDSF node 90, e.g. longitude, latitude, altitude. Still another possibility could be radio cells reported by the UEs using ANR (Automatic Neighbor Relation) function. This could be for example radio cells that the HeNB 20 is not able to detect, but that the first UE 10 may be able to detect.

Interfaces introduced in FIG. 7 are the interface, CSGi, between the ANDSF node 90 and the CSG database 70 and the interface, ANDSFi, between the first UE 10 and the ANDSF node 90. Other aspects are that the HeNB O&M is based on ACS 80 and that the HeNB 20 contacts the ANDSF node 90 and provides the needed information to the ANDSF node 90.

Hence, an efficient way of distributing the cell information to relevant UEs is provided.

In the illustrated examples of FIGS. 5-7, manners of distributing cell information to relevant UE-1 is illustrated. It should be understood that the cell information may be distributed to any, some, or all UEs being in a CSG member group of the CSG-123.

The method steps performed in the ANDSF node 90 for distributing CSG information in the radio telecommunications network according to a general embodiment will now be described with reference to a flowchart depicted in FIG. 8. The CSG information comprises an Allowed CSG List of a first user equipment 10 and cell information indicating position of a radio cell with controlled access. The radio cell is associated to the Allowed CSG List, that is, the CSG ID of the radio cell is comprised in the Allowed CSG List. The method steps do not have to be taken in the order stated below, but may be taken in any suitable order.

In step 800, the ANDSF node 90 retrieves the Allowed CSG List of the first UE 10 from a CSG Database 70 over a first network interface, CSGi, between the ANDSF node 90 and the CSG Database 70.

In step 810, the ANDSF node 90 triggers the first UE 10 to establish a connection to the ANDSF node 90 over a second network interface, ANDSFi, between the ANDSF node 90 and the first UE 10.

In step 820, the connection is setup between the ANDSF node 90 and the first user equipment.

In step 830, the ANDSF node 90 receives the cell information indicating the position of the radio cell with controlled access.

In step 840, the ANDSF node 90 sends the Allowed Closed Subscriber Group List to the first UE 10 over the set up connection. The ANDSF node 90 also sends the cell information to the first UE and/or a second UE in the radio telecommunications network. It should here be understood that the ANDSF node 90 may send the Allowed CSG List before receiving the cell information and the cell information may be sent at a later time.

Figure 8:
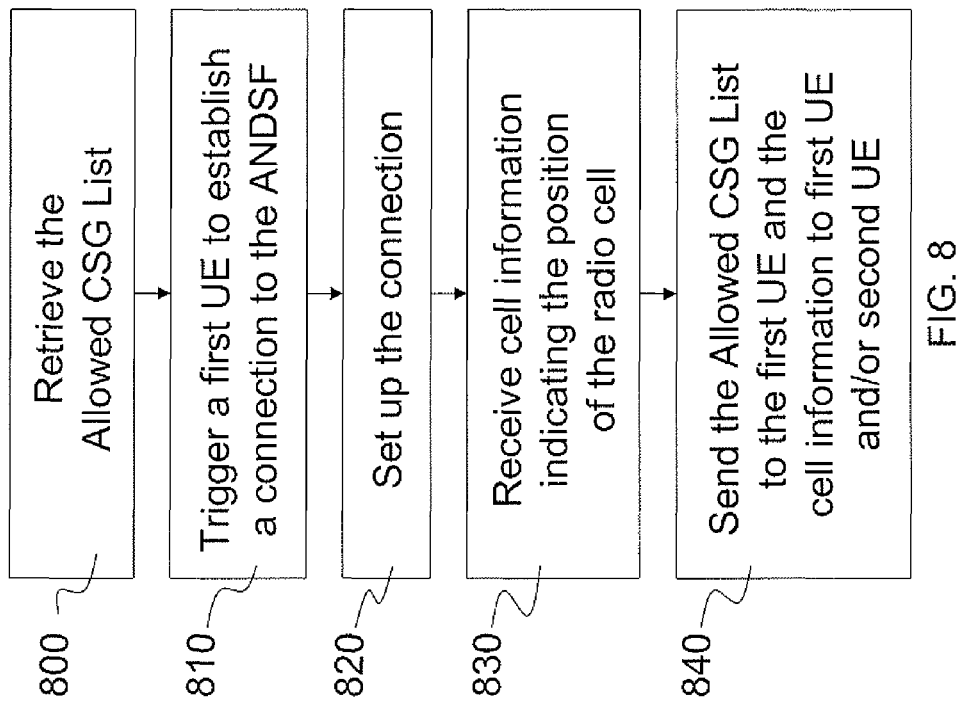
FIG. 8 shows a schematic flowchart for distributing CSG information to a UE.
Figure 9:
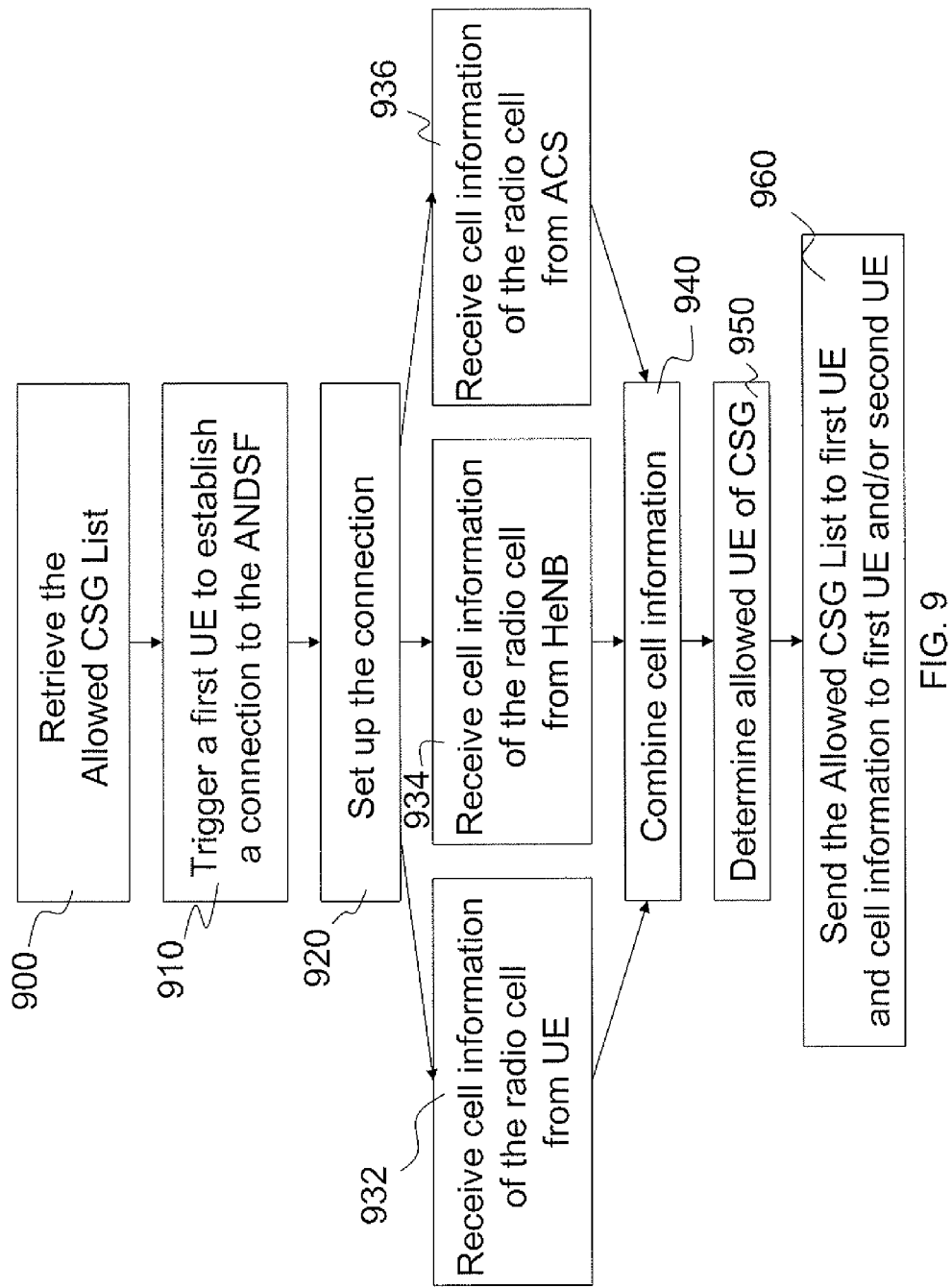
FIG. 9 shows a schematic flowchart of further embodiments for distributing CSG information to a UE.

In FIG. 9, some embodiments of the present solution in the ANDSF node 90 discussed in relation to FIG. 8 are disclosed. The method steps do not have to be taken in the order stated below, but may be taken in any suitable order.

In step 900, the ANDSF node 90 retrieves the Allowed CSG List of the radio cell from the CSG Database 70 over the first network interface, CSGi, between the ANDSF node 90 and the CSG Database 70. The step 900 in FIG. 9 corresponds to step 800 in FIG. 8.

In step 910, the ANDSF node 90 triggers the first UE 10 to establish the connection to the ANDSF node 90 over the second network interface, ANDSFi, between the ANDSF node 90 and the first UE 10. The step 910 in FIG. 9 corresponds to step 810 in FIG. 8.

In step 920, the connection is setup between the ANDSF node 90 and the first UE 10. The step 920 in FIG. 9 corresponds to step 820 in FIG. 8.

The ANDSF node 90 may then receive the cell information indicating the position of the radio cell with controlled access in a number of ways as exemplified in steps 932, 934, and 936.

In step 932, the ANDSF node 90 may receive the cell information from the first UE 10. In some embodiments, the cell information comprises identity of at least one detected radio cell overlaying the radio cell with controlled access, a so called radio cell footprint. Furthermore, the cell information may, in some embodiments, further comprise mobility events of the first UE 10 indicating neighbouring radio cells of the radio cell with controlled access. For example, logging successful and unsuccessful Hand Over (HO) attempts, and upload the logged mobility events to the ANDSF node 90. This can further improve the radio cell footprint definition and network planning using the radio cell IDs of the HO processes as the radio cell footprint.

In step 934, the ANDSF node 90 may receive the cell information from a HeNB 20 serving the first UE 10. In some embodiments, the cell information comprises a geographical location of the HeNB 20 from a GPS receiver of the HeNB 20 and/or operation and maintenance data of the HeNB 20.

In step 936, the ANDSF node 90 may receive the cell information from an ACS database 82 arranged to be used to configure the HeNB 20 serving the first UE 10.

The steps 932, 934, 936 may be performed in parallel or as alternatives. Thus, the ANDSF node 90 may receive cell information from more than one node.

In step 940, the ANDSF node 90 may combine the cell information with previously stored cell information related to the radio cell with controlled access into a combined cell information.

In step 950, the ANDSF node 90 may, in some embodiments, determine the first UE and/or the second UE to send the cell information to, by requesting a CSG member group list from the CSG database 70. The ANDSF node 90 then receives the CSG member group list and determines the first UE 10 and/or the second UE based on the CSG member group list. The CSG member list indicates at least one UE allowed to access the radio cell of the CSG.

In step 960, the ANDSF node 90 sends the Allowed CSG List to the first UE 10 over the set up connection. The ANDSF node 90 also sends the cell information to the first UE 10 and/or the second UE within the radio telecommunications network. The step 960 in FIG. 9 corresponds to step 840 in FIG. 8. In embodiments, wherein the cell information is combined, the combined cell information is sent to the first UE and/or the second UE within the radio telecommunications network.

In addition, the ANDSF node 90 may obtain CSG administrator information indicating that the first UE 10 is a manager of a CSG of the Allowed CSG List, wherein the ANDSF node 90 is triggered to retrieve the Allowed CSG List of the first user equipment 10.

Figure 10:
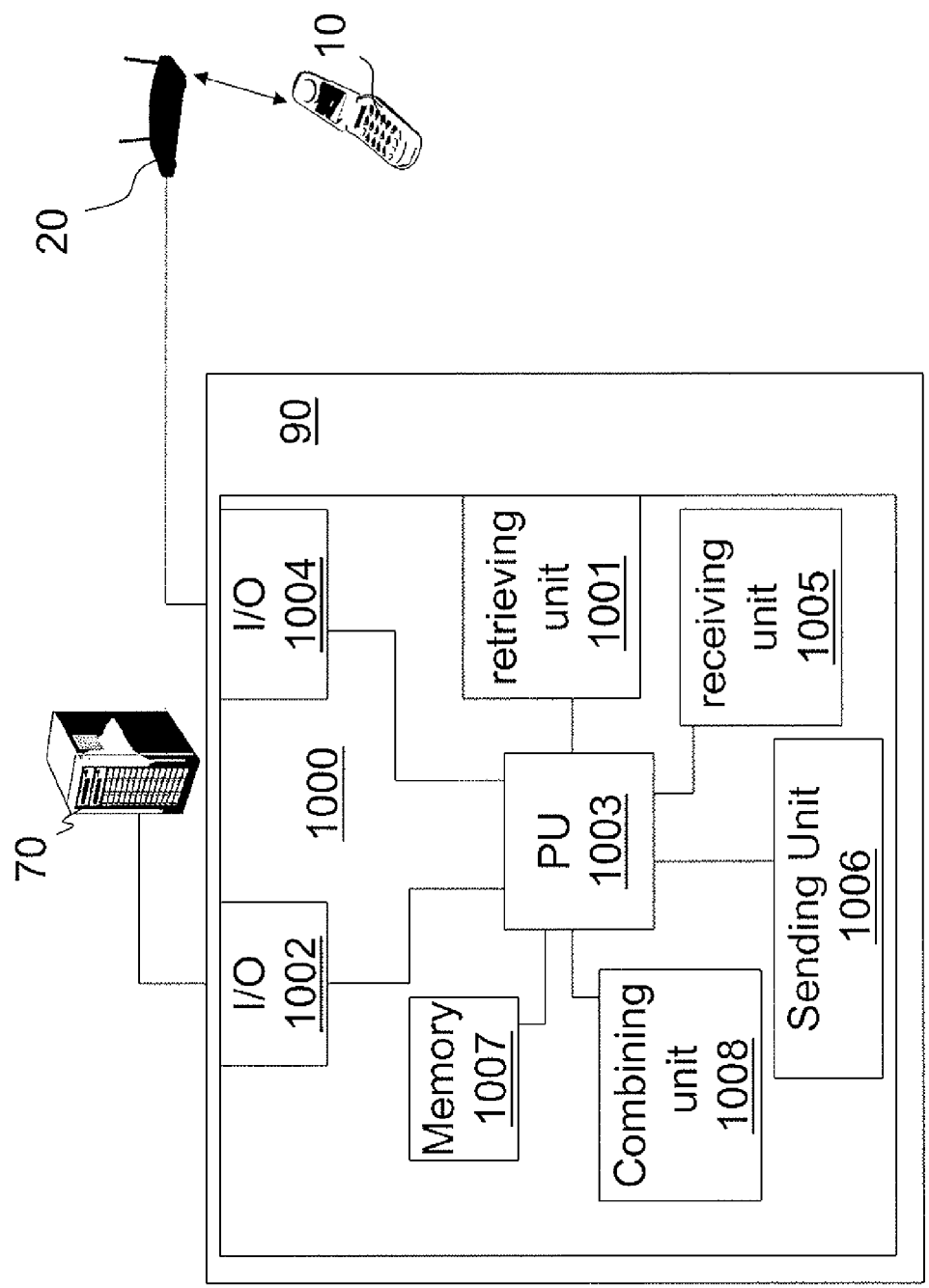
FIG. 10 shows a schematic overview of an arrangement in an ANDSF node.

To perform the method steps above for distributing the CSG information the ANDSF node 90 comprises an arrangement 1000 depicted in FIG. 10.

The arrangement 1000 comprises a retrieving unit 1001 arranged to retrieve the Allowed CSG List of the first UE 10 from the CSG database 70 over a first network interface unit 1002 between the ANDSF node 90 and the CSG database 70. The Allowed CSG List indicates a radio cell with controlled access that the first UE 10 is allowed to access.

The arrangement 1000 further comprises a processing unit (PU) 1003 arranged to trigger the first UE 10 to establish a connection to the ANDSF node 90 over a second network interface unit 1004 between the ANDSF node 90 and the first UE 10. The processing unit 1003 is further arranged to set up the connection to the first UE 10.

Additionally, the arrangement 1000 comprises a receiving unit (RX) 1005 arranged to receive cell information indicating the position of the radio cell with controlled access. The arrangement 1000 also comprises a sending unit (TX) 1006 arranged to send the Allowed Closed Subscriber Group List to the first UE 10 over the set up connection and the cell information to the first UE 10 and/or a second UE within the radio telecommunications network. The first UE 10 and/or second UE may be determined by analyzing a CSG member group indicating UEs that are allowed to access the radio cell of the CSG member group.

The arrangement 1000 may further comprise a memory unit 1007 wherein data such as cell information may be stored.

The arrangement 1000 may in some embodiments comprise a combining unit 1008 arranged to combine the cell information received with previously stored cell information related to the radio cell served by a HeNB 20 into a combined cell information. The combined cell information may then be sent to at least one user equipment in the CSG member group, the first and/or second UE within the radio telecommunications network.

The processing unit 1003 may further be arranged to determine the second UE from UEs allowed to access CSG. The allowed UEs may be determined by requesting CSG member group list from the CSG database 70.

The processing unit 1003 may comprise a central processing unit, a single processing unit, a plurality of processing units, and/or the like. It should also be understood that the retrieving unit 1001, the receiving unit 1005, the sending unit 1006, the processing unit 1003, the combining unit 1007, may be parts of a single processing unit or a plurality of processing units.

The memory unit 1007 may comprise a single memory unit, a plurality of memory units, external and/or internal memory units.

The method steps performed in the UE 10, denoted as the first UE 10 above, for receiving the CSG information according to a general embodiment will now be described with reference to a flowchart depicted in FIG. 11. The method steps do not have to be taken in the order stated below, but may be taken in any suitable order.

In step 1100, the UE 10 receives a trigger from an ANDSF node 90 to establish a connection to the ANDSF node 90 over a network interface between the ANDSF node 90 and the UE 10.

In step 1110, the UE 10 sets up the connection to the ANDSF node 90.

In step 1120, the UE 10 receives the Allowed CSG List indicating a radio cell with controlled access that the UE 10 is allowed to access over the set up connection from the ANDSF node 90. Furthermore, the UE 10 receives cell information indicating position of the radio cell. This cell information may be received at a different time than the Allowed CSG List.

In step 1130, the UE 10 stores the Allowed CSG List and the received cell information in the UE 10.

Figure 11:
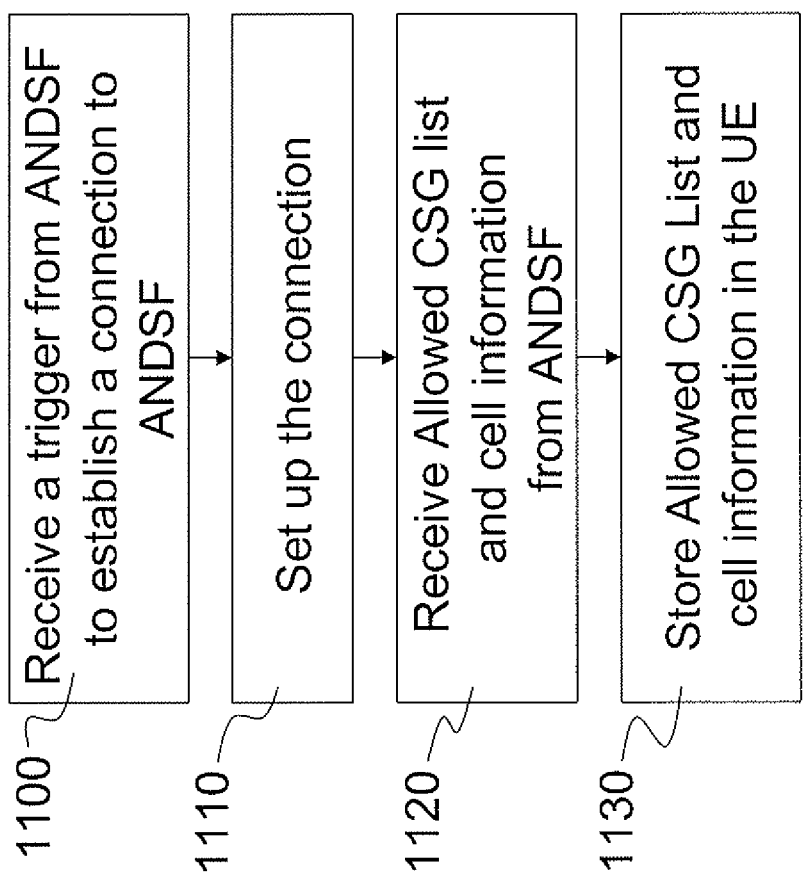
FIG. 11 shows a schematic flowchart for receiving CSG information at a UE.
Figure 12:
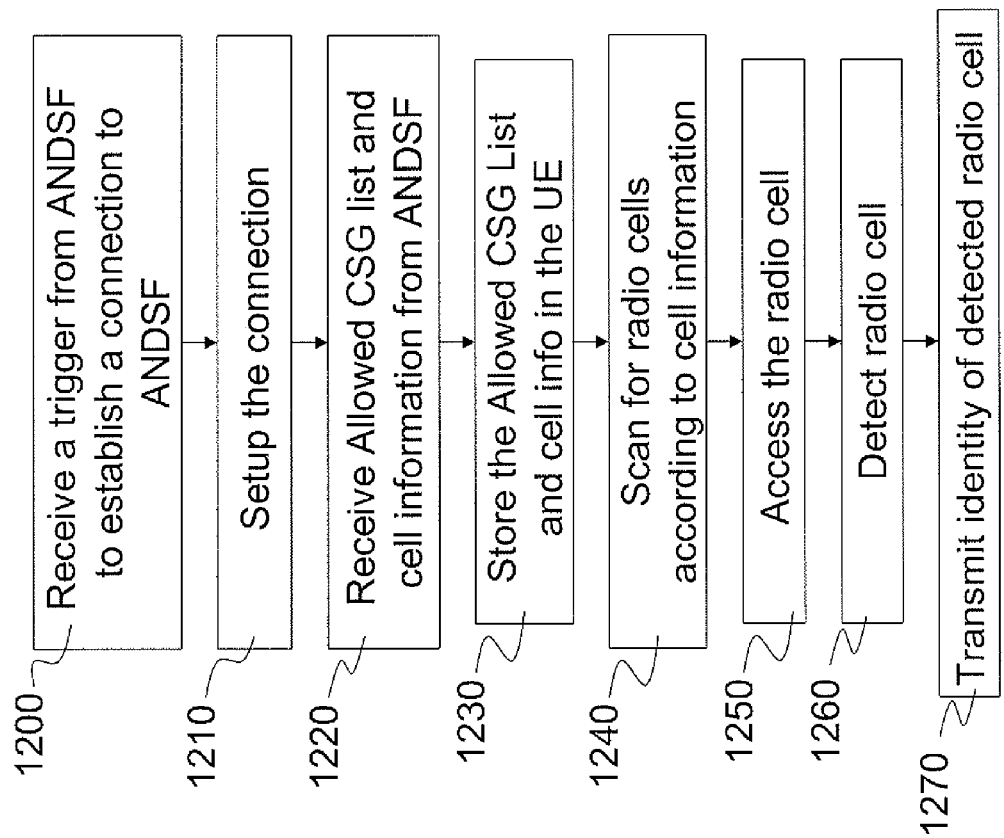
FIG. 12 shows a schematic flowchart of further embodiments for receiving CSG information at a UE.

In FIG. 12, some embodiments of the present solution in the UE 10 discussed in relation to FIG. 11 are disclosed. The method steps do not have to be taken in the order stated below, but may be taken in any suitable order.

In step 1200, the UE 10 receives the trigger from the ANDSF node 90 to establish the connection to the ANDSF node 90 over a network interface, ANDSi, between the ANDSF node 90 and the UE 10. The step 1200 in FIG. 12 corresponds to step 1100 in FIG. 11.

In step 1210, the UE 10 sets up the connection to the ANDSF node 90. The step 1210 in FIG. 12 corresponds to step 1110 in FIG. 11.

In step 1220, the UE 10 receives the Allowed CSG List indicating a radio cell with controlled access that the UE 10 is allowed to access over the set up connection from the ANDSF node 90. Furthermore, the UE 10 receives cell information indicating position of the radio cell. This cell information may be received at a different time than the Allowed CSG List. The step 1220 in FIG. 12 corresponds to step 1120 in FIG. 11.

In step 1230, the UE 10 stores the Allowed CSG List in the UE 10. The cell information is also stored thereon to, for example, to be used at a later time. The step 1230 in FIG. 12 corresponds to step 1130 in FIG. 11.

In step 1240, the UE 10 may scan for radio cells for detecting a radio cell according to the received cell information of the radio cell with controlled access. The step 1240 in FIG. 12 corresponds to step 1140 in FIG. 11.

In step 1250, the UE 10 may access, when the UE has detected the radio cell according to the received cell information, the radio cell with controlled access.

In step 1260, the UE 10 may then detect at least one other radio cell. The UE 10 may then form a radio cell footprint of detected cell or cells.

In step 1270, the UE 10 may transmit an identity of the other radio cell to the ANDSF node 90.

Figure 13:
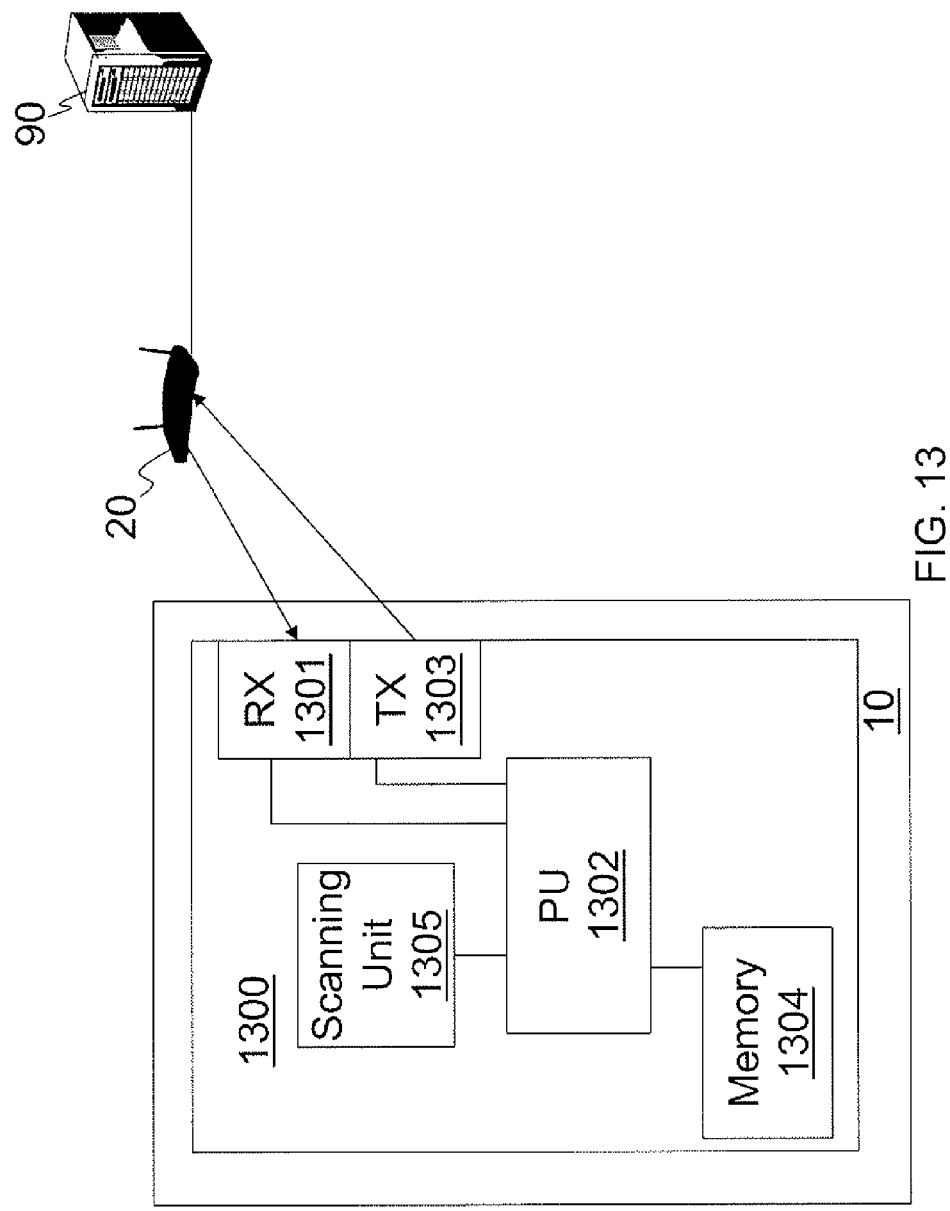
FIG. 13 shows a schematic overview of an arrangement in a UE.

To perform the method steps above for receiving the CSG information the UE 10 comprises an arrangement 1300 depicted in FIG. 13. The UE 10 may comprise a mobile phone, a Personal Digital Assistant (PDA), a laptop and/or the like.

The arrangement 1300 comprises a receiving unit (RX) 1301 arranged to receive the trigger from the ANDSF node 90 to establish the connection to the ANDSF node 90 over the network interface, ANDSFi, between the ANDSF node 90 and the UE 10.

The arrangement 1300 further comprises a processing unit (PU) 1302 arranged to set up the connection to the ANDSF node 90 over a transmitting unit (TX) 1303. The receiving unit 1301 is further arranged to receive the Allowed CSG List indicating a radio cell with controlled access that the UE 10 is allowed to access over the set up connection from the ANDSF node 90 and cell information indicating position of the radio cell. The cell information may be received via the serving HeNB 20, or another access point such as an eNB.

The arrangement 1300 further comprises a memory unit 1304 arranged to be used to store the Allowed CSG List and the cell information in the UE 10.

Furthermore, the arrangement 1300 may comprise a scanning unit 1305 arranged to scan for radio cells for detecting a radio cell of a HeNB 20 according to the received cell information of the radio cell with controlled access.

The transmitting unit 1303 may be arranged to access, when the UE has detected the radio cell according to the received cell information, the radio cell with controlled access.

The scanning unit 1305 may furthermore be arranged to detect at least one other radio cell and the transmitting unit 1303 may be arranged to transmit an identity of the other radio cell to the ANDSF node 90.

The processing unit 1302 may comprise a central processing unit, a single processing unit, a plurality of processing units, and/or the like. It should also be understood that the processing unit 1302 and the scanning unit 1305 may be a part of a single processing unit or a plurality of processing units.

The memory unit 1304 may comprise a single memory unit, a plurality of memory units, external and/or internal memory units.

Figure 14:
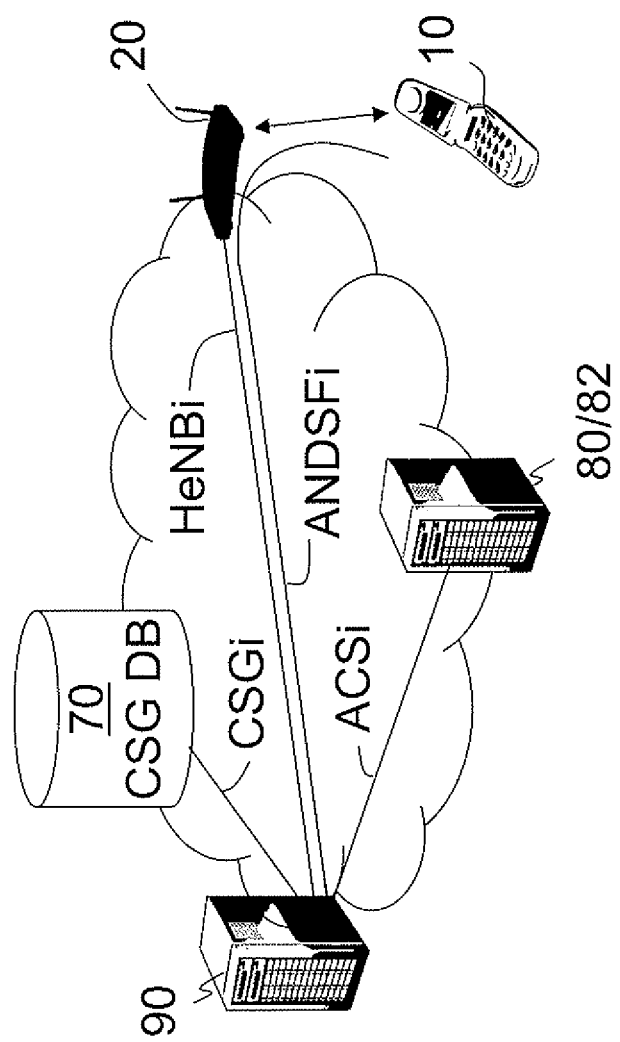
FIG. 14 shows a schematic overview of a system in a radio telecommunications network.

In FIG. 14, a system in the radio telecommunications network is shown. The system comprises the CSG database 70 and the ANDSF node 90 arranged to be connected to the CSG database 70. The system further comprises the first UE 10 arranged to be connected to the ANDSF node 90.

The ANDSF node 90 is further arranged to retrieve the Allowed CSG List of the first UE 10 from the CSG database 70 over the first network interface CSGi between the ANDSF node 90 and the CSG Database 70.

Additionally, the ANDSF node 90 is arranged to trigger the first UE 10 to establish the connection to the ANDSF node 90 over the second network interface ANDSFi between the ANDSF node 90 and the first UE 10.

The ANDSF node 90 is further arranged to set up the connection to the first UE 10, and to receive cell information indicating the position of a radio cell with controlled access associated to the Allowed CSG List.

Furthermore, the ANDSF 90 is arranged to send to the first user equipment 10 over the set up connection, the Allowed CSG List, and to the first user equipment 10 UE-1 and/or a second user equipment UE-2 within the radio telecommunications network, the cell information.

In some embodiments, the system further comprises the Automatic Configuring Server 80/82 arranged to send the cell information to the ANDSF node 90 over the ACSi.

In some embodiments, the system further comprises a base station, such as the HeNB 20, arranged to serve the radio cell and to send the cell information to the ANDSF node 90 over the HeNBi.

In some embodiments, the first UE and/or a second UE in the system is arranged to send the cell information to the ANDSF node 90 over the ANDSFi or other interfaces.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in an Access Network Discovery and Selection Function (ANDSF) node, the ANDSF node being included in a radio telecommunications network and configured to distribute Closed Subscriber Group (CSG) information in the radio telecommunications network, the CSG information including an Allowed CSG List of a first user equipment and cell information indicating a position of a radio cell providing controlled access according to the Allowed CSG List, wherein the Allowed CSG List indicates that the first user equipment is allowed to access the radio cell, the method comprising:
retrieving the Allowed CSG List of the first user equipment from a CSG Database over a first network interface between the ANDSF node and the CSG Database;
triggering the first user equipment to establish a connection to the ANDSF node over a second network interface between the ANDSF node and the first user equipment;
setting up the connection to the first user equipment;
receiving the cell information indicating the position of the radio cell providing controlled access;
sending the Allowed CSG list to the first user equipment over the set up connection, and sending the cell information to the first user equipment, a second user equipment within the radio telecommunications network, or both.

2. The method of claim 1 further comprising:
combining the cell information with previously stored cell information related to the radio cell into a combined cell information, wherein the combined cell information is sent to the first user equipment, the second user equipment, or both.

3. The method of claim 1 further comprising:
determining which user equipment the cell information will be sent to, wherein the determining comprises:
requesting a CSG member group list from the CSG Database, wherein the CSG member group list indicates at least one user equipment allowed to access the radio cell;
receiving the CSG member group list, and based on the CSG member group list determining whether the cell information will be sent to the first user equipment, the second user equipment, or both.

4. The method of claim 1 wherein the received cell information is received from the first user equipment.

5. The method of claim 1 wherein the received cell information is received from a home base station serving the first user equipment.

6. The method of claim 5 wherein the received cell information comprises a geographical location of the home base station from a GPS receiver of the home base station, operation and maintenance data of the home base station, or both.

7. The method of claim 1 wherein the received cell information is received from an Automatic Configuration Server (ACS) Database arranged to be used for configuring a home base station serving the first user equipment.

8. The method of claim 1 wherein the cell information comprises an identity of at least one detected radio cell overlaying the radio cell providing controlled access.

9. The method of claim 1 wherein the cell information further comprises mobility events of the first user equipment indicating neighboring radio cells of the radio cell providing controlled access.

10. The method of claim 1 further comprising obtaining CSG administrator information indicating that the first user equipment is a manager of a CSG of the Allowed CSG List, and wherein the ANDSF node is triggered to retrieve the Allowed CSG List of the first user equipment.

11. An Access Network Discovery and Selection Function (ANDSF) node within a radio telecommunications network, comprising:
a retrieving unit configured to retrieve an Allowed Closed Subscriber Group (CSG) List of a user equipment from a CSG Database over a first network interface unit between the ANDSF node and the CSG Database, wherein the Allowed CSG List indicates a radio cell providing controlled access that the first user equipment is allowed to access;

a processing unit configured to trigger the first user equipment to establish a connection to the ANDSF node over a second network interface unit between the ANDSF node and the first user equipment, wherein the processing unit is further arranged to set up the connection to the first user equipment;

a receiving unit configured to receive cell information indicating the position of the radio cell providing controlled access;

a sending unit configured to send the allowed CSG List to the first user equipment over the set up connection, and to send the cell information to the first user equipment, a second user equipment within the radio telecommunications network, or both.

12. A system in a radio telecommunications network comprising a Closed Subscriber Group (CSG) database, an Access Network Discovery and Selection Function (ANDSF) node arranged to be connected to the CSG database, and a first user equipment arranged to be connected to the ANDSF node, the ANDSF node being configured to:

retrieve an Allowed CSG List of the first user equipment from the CSG database over a first network interface between the ANDSF node and the CSG Database;

trigger the first user equipment to establish a connection to the ANDSF node over a second network interface between the ANDSF node and the first user equipment;

set up the connection to the first user equipment;

receive cell information indicating the position of a radio cell providing controlled access according to the Allowed CSG List;

send the Allowed CSG list to the first user equipment over the set up connection, and send the cell information to the first user equipment, a second user equipment within the radio telecommunications network, or both.

13. The system of claim 12 further comprising an Automatic Configuring Server arranged to send the cell information to the ANDSF node.

14. The system of claim 12 further comprising a base station arranged to serve the radio cell and to send the cell information to the ANDSF node.

15. The system of claim 12 wherein the first user equipment, the second user equipment, or both, are arranged to send the cell information to the ANDSF node.

* * * * *